United States Patent
Takahashi et al.

(10) Patent No.: US 9,960,678 B2
(45) Date of Patent: May 1, 2018

(54) POWER CONVERTER WITH RESONANT CIRCUIT

(71) Applicants: DENSO CORPORATION, Kariya, Aichi-pref. (JP); NATIONAL UNIVERSITY CORPORATION OITA UNIVERSITY, Oita, Oita-pref. (JP)

(72) Inventors: Eisuke Takahashi, Kariya (JP); Masaya Takahashi, Kariya (JP); Kimihiro Nishijima, Oita (JP)

(73) Assignees: DENSO CORPORATION, Kariya (JP); NATIONAL UNIVERSITY CORPORATION OITA UNIVERSITY, Oita (JP)

( * ) Notice: Subject to any disclaimer, the term of this patent is extended or adjusted under 35 U.S.C. 154(b) by 0 days. days.

(21) Appl. No.: 15/628,769

(22) Filed: Jun. 21, 2017

(65) Prior Publication Data

US 2017/0373592 A1    Dec. 28, 2017

(30) Foreign Application Priority Data

Jun. 22, 2016   (JP) .................................. 2016-123944

(51) Int. Cl.
H02M 3/156   (2006.01)
H02M 3/07    (2006.01)
H02M 3/155   (2006.01)

(52) U.S. Cl.
CPC ............. *H02M 3/156* (2013.01); *H02M 3/07* (2013.01); *H02M 2003/1555* (2013.01); *H02M 2003/1566* (2013.01)

(58) Field of Classification Search
CPC ................... H02M 3/156; H02M 3/07; H02M 2003/1555; H02M 2003/1566
See application file for complete search history.

(56) References Cited

U.S. PATENT DOCUMENTS

2004/0066178 A1    4/2004 Mizoguchi et al.

FOREIGN PATENT DOCUMENTS

JP   2009-112182 A   5/2009
JP   2014-033589 A   2/2014

*Primary Examiner* — Emily P Pham
(74) *Attorney, Agent, or Firm* — Oliff PLC

(57) ABSTRACT

In a power converter, a first electrical path connects between the series resonant circuit and a selected terminal from the high- and low-side input and output terminals of the power converter. An auxiliary diode is provided on one of the series resonant circuit and the first electrical path. An auxiliary switch, when turned on, causes an inductor current to flow through the auxiliary diode to the resonance inductor, thus storing electromagnetic energy into the resonance inductor, and causes the resonance inductor and the capacitance component of the series resonant circuit to resonate with each other. A second electrical path bypasses the auxiliary switch for flow of the inductor current. A discharge unit is provided on the second electrical path. The discharge unit is activated to discharge the electromagnetic energy stored in the resonance inductor via the second electrical path.

16 Claims, 14 Drawing Sheets

$\left(\dfrac{Vout}{Vin} \leqq \dfrac{1}{2}\right)$ t3~t4 t4~t5 t5~t6

POWER CONVERTER WITH RESONANT CIRCUIT

CROSS REFERENCE TO RELATED APPLICATIONS

This application is based on and claims the benefit of priority from Japanese Patent Application 2016-123944 filed on Jun. 22, 2016, the disclosure of which is incorporated in its entirety herein by reference.

TECHNICAL FIELD

The present disclosure relates to power converters capable of performing on-off switching operations of switches to convert an input voltage to a predetermined output voltage.

BACKGROUND

One type of power converters is designed to perform zero-voltage switching control, referred to simply as ZVS control. ZVS control performs switching of a switch or a switching element while a voltage across the switch is zero. Power converters, which are capable of performing ZVS control, aim to reduce switching loss of their switching elements to have higher efficiency accordingly. An example of these power converters is disclosed as a direct-current (DC) to direct-current converter, referred to as a DC-DC converter, in Japanese Patent Application No. 2004-129393, which is referred to as patent document 1.

The DC-DC converter disclosed in patent document 1 includes first and second main switches connected in series between input terminals of the DC-DC converter, and a smoothing inductor connected between an output terminal of the DC-DC converter and the connection point between the first and second main switches. The DC-DC converter also includes an auxiliary circuit, which is comprised of a resonance inductor and an auxiliary switch connected in series to each other. The auxiliary circuit is connected between the output terminal and the connection point between the first and second main switches in parallel to the smoothing inductor. The DC-DC converter further includes resonance capacitors connected in parallel to the respective first and second main switches.

The DC-DC converter measures an auxiliary current flowing through the auxiliary resonant circuit using a current sensor.

When the measured auxiliary current satisfies a predetermined ZVS condition, the DC-DC converter turns off the second main switch, and turns on the auxiliary switch within the period from turn-off of the second main switch to turn-on of the first main switch. This results in electrical energy being supplied from the output terminal to the resonance inductor. This causes the resonance inductor and the resonance capacitors to resonate with each other.

After lapse of predetermined dead time since the turn-off of the second main switch, the DC-DC converter turns on the first main switch while the voltage across the first main switch is kept zero. This therefore results in reliable ZVS control of the first main switch, resulting in lower switching loss of the first main switch and lower switching noise.

SUMMARY

The auxiliary switch, while in the on state, may be erroneously turned off due to, for example, noise. Turning off of the auxiliary switch may result in the auxiliary current flowing through the resonance inductor rapidly falling, resulting in the occurrence of an excessive surge voltage across the resonance inductor due to rapid decrease of the auxiliary current.

The inventors of the present application have focused on this problem.

That is, an aspect of the present disclosure seeks to provide power converters, each of which performs ZVS control using an auxiliary switch and a resonance inductor, capable of reducing a voltage applied across the resonance inductor.

An exemplary aspect of the present disclosure is a power converter having high- and low-side input terminals connected to a power source, and high- and low-side output terminals connected to an electrical load. The power converter includes a first main switch, and a second main switch connected in series to the first main switch, a capacitance component being connected in parallel to at least one of the first and second main switches. The power converter includes a main inductor having first and second ends. The first end is connected to a connection point of the first and second main switches. The power converter includes a controller configured to complementarily turn on the first and second main switches to 1. Charge electromagnetic energy input from the power source via the input terminals into the main inductor
2. Output the electromagnetic energy charged in the main inductor to the electrical load via the output terminals The power converter includes a resonance inductor connected in series to the capacitance component. The resonance inductor and the capacitance component constitute a series resonant circuit. The power converter includes a first electrical path connecting between the series resonant circuit and one of the high-side input terminal and the high-side output terminal. The power converter includes an auxiliary diode having a forward direction. The auxiliary diode is provided on one of the series resonant circuit and the first electrical path such that the forward direction is along a direction from the selected terminal toward the resonance inductor. The power converter includes an auxiliary switch provided on one of the series resonant circuit and the first electrical path. The auxiliary switch is configured to, when turned on, cause 1. An inductor current to flow through the auxiliary diode to the resonance inductor, thus storing electromagnetic energy in the resonance inductor
2. The resonance inductor and the capacitance component of the series resonant circuit to resonate with each other.

The power converter includes a second electrical path for the inductor current, the second electrical path sharing a part of the first electrical path while bypassing the auxiliary switch. The power converter includes a discharge unit provided on the second electrical path, the discharge unit being activated to discharge the electromagnetic energy stored in the resonance inductor via the second electrical path.

When turned on, the auxiliary switch causes the resonance inductor and the capacitance component of the series resonant circuit to resonate with each other. This resonance enables a voltage across the capacitance component being substantially zero. This enables the ZVS control of turn-on of at least one of the first and second main switches connected in parallel to the capacitance component to be carried out. This results in lower switching loss and lower noise when at least one of the first and second main switches are turned on.

Additionally, the discharge unit provided on the second electrical path is activated to discharge the electromagnetic energy stored in the resonance inductor via the second electrical path even if an overvoltage is applied across the resonance inductor, thus protecting the resonance inductor from the overvoltage.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
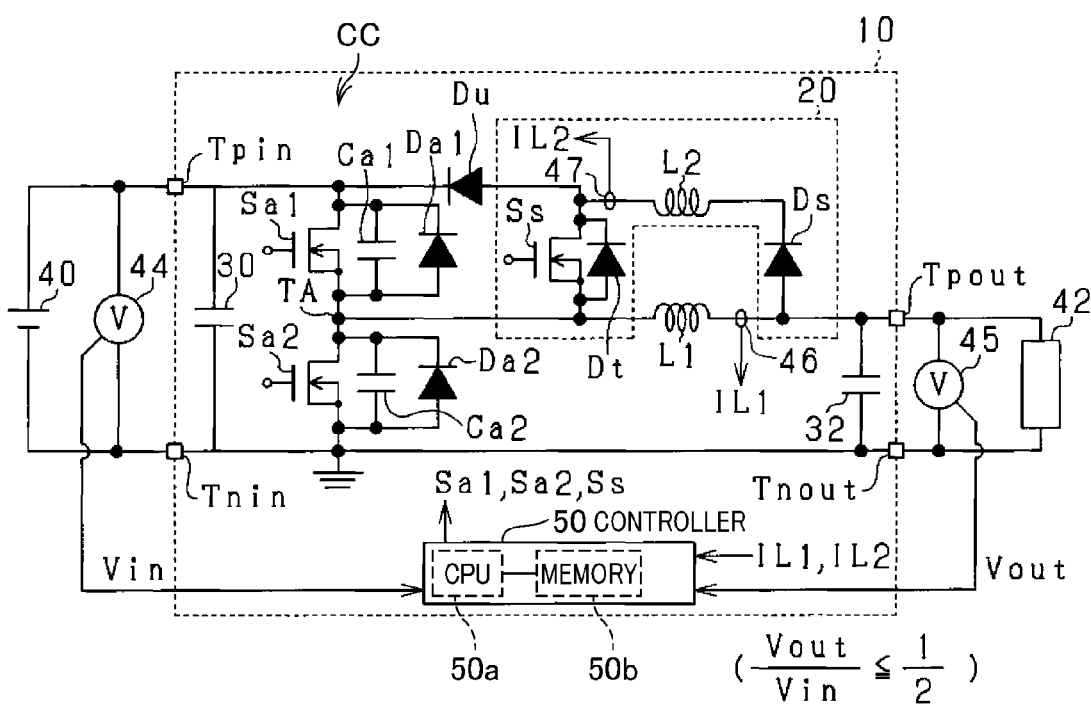
FIG. 1 is a circuit and block diagram schematically illustrating an example of the overall structure of a power converter according to the first embodiment of the present disclosure.

The following describes specific embodiments of the present disclosure with reference to the accompanying drawings. In the embodiments, like parts between the embodiments, to which like reference characters are assigned, are omitted or simplified in order to eliminate redundant description.

First Embodiment

The following describes a power converter 10 according to the first embodiment of the present disclosure; the power converter 10 is a non-isolated DC-DC converter as an example of a power converter according to the present disclosure.

Referring to FIG. 1, the power converter 10 is designed as a step-down converter for stepping down an input voltage to output a stepped-down voltage.

The power converter 10 includes a first main switch Sa1, a second main switch Sa2, first and second main capacitors Ca1 and Ca2, and a main inductor or a main reactor, such as a smoothing inductor, L1. The power converter 10 also includes a smoothing capacitor, i.e. a filter capacitor, 30, a smoothing capacitor, i.e. a filter capacitor, 32, an auxiliary circuit 20, a diode Du serving as, for example, a voltage limiter or a discharge unit, and a controller 50.

The power converter 10 has a first pair of high- and low-side input terminals Tpin and Tnin to which the positive and negative terminals of a DC power source, such as a rechargeable battery, 40 are respectively connected. The power converter 10 also has a second pair of high- and low-side output terminals Tpout and Tnout to which high- and low-side terminals of an electrical load 42 are respectively connected.

The high- and low-side input terminals Tpin and Tnin according to the first embodiment serve as high- and low-side input terminals of the power converter 10, and the high- and low-side output terminals Tpout and Tnout according to the first embodiment serve as high- and low-side output terminals of the power converter 10. The low-side input terminal Tnin and the low-side output terminal Tnout are connected to each other via a common signal ground line having a ground potential of 0 V.

That is, the power converter 10, which serves as a step-down converter, is configured to step down an input voltage Vin input to the high- and low-side input terminals Tpin and Tnin, and output, as an output voltage Vout, the stepped-down voltage to the electrical load 42 via the high- and low-side output terminals Tpout and Tnout.

The first and second main switches Sa1 and Sa2 are connected in series between the high- and low-side input terminals Tpin and Tnin to form a series switch unit, so that the first main switch Sa1 serves as an upper-arm, i.e. a high-side, switch, and the second main switch Sa2 serves as a lower-arm, i.e. a low-side, switch. The first embodiment uses an N-channel metal-oxide semiconductor field-effect transistor (MOSFET) as each of the switches Sa1 and Sa2.

Specifically, the drain of the first main switch Sa1 is connected to the positive terminal of the DC power source 40 via the high-side input terminal Tpin, and the source of the first main switch Sa1 is connected at a connection point TA to the drain of the second main switch Sa2. The source of the second main switch Sa2 is connected to the negative terminal of the DC power source 40 via the low-side input terminal Tnin.

The drain and source of each of the first and second main switches Sa1 and Sa2 serve as input and output terminals of the corresponding one of the first and second main switches Sa1 and Sa2.

The power converter 10 includes a first flyback diode Da1 connected across the first main switch Sa1 in antiparallel to the first main switch Sa1, and a second flyback diode Da2 connected across the second main switch Sa2 in antiparallel to the second main switch Sa2. An intrinsic diode of each of the first and second main switches Sa1 and Sa2, i.e. the MOSFETs, can serve as the corresponding one of the first and second flyback diodes Da1 and Da2. External diodes can be connected across the respective first and second main switches Sa1 and Sa2 as the first and second flyback diodes Da1 and Da2.

The first main capacitor Ca1 is connected across the first main switch Sa1 in parallel to the first main switch Sa1, and the second main capacitor Ca2 is connected across the second main switch Sa2 in parallel to the second main switch Sa2. A floating capacitance of each of the first and second main switches Sa1 and Sa2 can serve as the corresponding one of the first and second main capacitors Ca1 and Ca2. External snubber capacitors can be connected across the respective first and second main switches Sa1 and Sa2 as the first and second main capacitors Ca1 and Ca2.

The main inductor L1, which serves as, for example, a first magnetic component, has opposing first and second ends. The first end of the main inductor L1 is connected to the connection point TA, and the second end of the main inductor L1 is connected to the high-side terminal Tpout.

The smoothing capacitor 30, which serves as, for example a first smoothing capacitor, has a high-side end and a low-side end. The high-side end of the smoothing capacitor 30 is connected to the drain of the first main switch Sa1, and the low-side end of the smoothing capacitor 30 is connected to the source of the second main switch Sa2, so that the smoothing capacitor 30 is connected in parallel to the series switch unit and the DC power source 40. The drain of the first main switch Sa1 serve as a high-side terminal of the series switch unit, and the source of the second main switch Sa2 serves as a low-side terminal of the series switch unit.

The smoothing capacitor 32, which serves as, for example a second smoothing capacitor, has a high-side end and a low-side end. The high-side end of the smoothing capacitor 32 is connected to the second end of the main inductor L1, and also connected to the high-side terminal of the electrical load 42 via the high-side output terminal Tpout. The low-side end of the smoothing capacitor 32 is connected to the source of the second main switch Sa2, and also connected to the low-side terminal of the electrical load 42 via the low-side output terminal Tnout. That is, the smoothing capacitor 32 is connected in parallel to the electrical load 42.

Each of the smoothing capacitors 30 and 32 is configured to stabilize a corresponding one of the input voltage Vin to the high- and low-side input terminals Tpin and Tnin of the power converter 10 and the output voltage Vout of the power converter 10 between the high- and low-side output terminals Tpout and Tnout. Note that the same reference characters Vin and Vout are used to represent voltages input to and output from or vice versa in the power converters according to all the embodiments, but values of the voltages Vin and Vout can be independently set for the respective embodiments.

The auxiliary circuit 20, which also serves as, for example, an auxiliary switching circuit, is connected across the main inductor L1 in parallel to the main inductor L1.

The auxiliary circuit 20 includes an auxiliary diode Ds, an auxiliary switch Ss, and a resonance inductor L2 connected in series. The first embodiment uses an N-channel MOSFET as the auxiliary switch Ss. A diode Dt is connected across the auxiliary switch Ss in antiparallel to the auxiliary switch Ss. An intrinsic diode of the auxiliary switch Ss, i.e. the MOSFET, can serve as the diode Dt. An external diode can be provided to be connected across the auxiliary switch Ss as the diode Dt.

The resonance inductor L2 has opposing first and second ends. The first end of the resonance inductor L2 is connected to the drain of the auxiliary switch Ss, and the second end of the resonance inductor L2 is connected to the cathode of the auxiliary diode Ds. The anode of the auxiliary diode Ds is connected to the second end of the main inductor L1. The source of the auxiliary switching element Ss is connected to the first end of the main inductor L1.

Each of the main inductor L1 and the resonance inductor L2 has an inductance, and the inductance of the resonance inductor L2 is set to be sufficiently smaller than the inductance of the main inductor L1.

The power converter 10 includes a first voltage sensor 44, a second voltage sensor 45, a first current sensor 46, and a second current sensor 47; the sensors 44 to 47 are connected to the controller 50.

The first voltage sensor 44 serves as means for measuring the input voltage Vin between the positive and negative terminals of the DC power source 40, i.e. between the high- and low-side input terminals Tpin and Tnin, and for sending a signal indicative of the measured input voltage Vin to the controller 50.

The second voltage sensor 45 serves as means for measuring the output voltage Vout between the positive and negative terminals of the electrical load 42, i.e. between the high- and low-side output terminals Tpout and Tnout, and for sending a signal indicative of the measured output voltage Vout to the controller 50.

The first current sensor 46 serves as means for measuring a first current, i.e. a main current, IL1 flowing through the main inductor L1, and for sending a signal indicative of the measured value of the first current IL1 to the controller 50.

The second current sensor 47 serves as means for measuring a second current, i.e. an inductor current, IL2 flowing through the resonance inductor L2, and for sending a signal indicative of the measured value of the second current IL2 to the controller 50.

The controller 50 is designed as, for example, a microcomputer circuit, which includes essentially, for example, a CPU 50a, a memory 50b, and its peripheral circuit including an I/O unit. The memory 50b includes, for example, a ROM, which is an example of a non-transitory storage medium, and a RAM. The controller 50 is connected to respective control terminals, i.e. the respective gates, of the first main switch Sa1, the second main switch Sa2, and the auxiliary switch Ss.

The controller 50 periodically performs on-off switching operations of the first and second main switches Sa1 and Sa2. Specifically, the controller 50 complementarily turns on the first main switch Sa1 and the second main switch Sa2 with predetermined dead times between their on periods. The controller 50 determines the switching period Tsw, which is comprised of a turn-on period Ton and a turn-off period Toff, for each of the first and second main switches Sa1 and Sa2 in accordance with the ratio of the output voltage Vout to the input voltage Vin. The ratio, which is expressed as Vout/Vin, will be referred to as a step-down ratio. In addition, the controller 50 sets a first duty of the first main switch Sa1 for each switching period Tsw to a value equal to or lower than 0.5. The first duty of the first main switch Sa1 for each switching period Tsw represents the ratio of the turn-on period time Ton to the corresponding switching period Tsw. That is, the controller 50 sets the first duty of the first main switch Sa1 for each switching period Tsw to be lower than a second duty of the second main switch Sa2 for the corresponding switching period Tsw.

Specifically, when the first main switch Sa1 is on while the second main switch Sa2 is off, the DC power source 40 causes a current to flow to the main inductor L1 via the first main switch Sa1, so that electromagnetic energy based on the current is stored in the main inductor L1. Thereafter, when the first main switch Sa1 is turned off while the second main switch Sa2 is off, a flyback current flows from the main inductor L1 through the smoothing capacitor 32 and the second flyback diode Da2.

Thereafter, when the second main switch Sa2 is turned on while the first main switch Sa1 is off, the electromagnetic energy stored in the main inductor L1 causes a current to flow from the main inductor L1 to the electrical load 21 connected to the high- and low-side output terminals Tpout and Tnout. This results in the input voltage Vin of the DC power source 40 to the power converter 10 being stepped down to a predetermined voltage. The predetermined stepped-down voltage is output from the high- and low-side output terminals Tpout and Tnout to the electrical load 42.

The controller 50 is also operative to periodically turn on the auxiliary switch Ss based on a predetermined switching period TswA; the switching period TswA is comprised of a turn-on period and a turn-off period for the auxiliary switch Ss.

The diode Du is provided between the high-side input terminal Tpin and the resonance inductor L2. Specifically, the anode of the diode Du is connected to the first end of the resonance inductor L2, and the cathode of the diode Du is connected to the high-side input terminal Tpin.

Next, the following describes fundamental operations of the power converter 10 with reference to FIGS. 2A to 9. FIGS. 2A to 2J are a joint timing chart schematically illustrating how predetermined parameters of the power converter 10 change with time.

Specifically, each of FIGS. 2A to 2C is a timing chart schematically illustrating how on/off states of the corresponding one of the first main switch Sa1, the second main switch Sa2, and the auxiliary switch Ss change with time.

FIG. 2D is a timing chart schematically illustrating how a drain-source voltage, expressed by reference character Vds1, of the first main switch Sa1 changes with time. The drain-source voltage Vds1 serves as an input-output terminal voltage of the first main switch Sa1.

FIG. 2E is a timing chart schematically illustrating how a drain current, expressed by reference character Ids1, of the first main switch Sa1, changes with time.

FIG. 2F is a timing chart schematically illustrating how a drain-source voltage, expressed by reference character Vds2, of the second main switch Sa2 changes with time. The drain-source voltage Vds2 serves as an input-output terminal voltage of the second main switch Sa2.

FIG. 2G is a timing chart schematically illustrating how a drain current, expressed by reference character Ids2, of the second main switch Sa2, changes with time.

FIG. 2H is a timing chart schematically illustrating how a drain-source voltage, expressed by reference character Vdss, of the auxiliary switch Ss changes with time. The drain-source voltage Vdss serves as an input-output terminal voltage of the auxiliary switch Ss.

FIG. 2I is a timing chart schematically illustrating how the first current IL1 flowing through the main inductor L1 changes with time, and FIG. 2J is a timing chart schematically illustrating how the second current IL2 flowing through the resonance inductor L2 change with time.

Note that the direction in which the drain current Ids1 of the first main switch Sa1 flows from the drain to the source is defined as a positive direction, and the direction in which the drain current Ids2 of the second main switch Sa2 flows from the source to the drain is defined as a positive direction. The direction in which the second current IL2 flows from the drain of the auxiliary switch Ss to the source thereof is defined as a positive direction. In other words, the direction in which the second current IL2 flows from its first end to its second end via the auxiliary diode Ds is defined as the positive direction. The direction in which the first current IL1 flows from its first end to its second end is defined as a positive direction.

Figure 2:
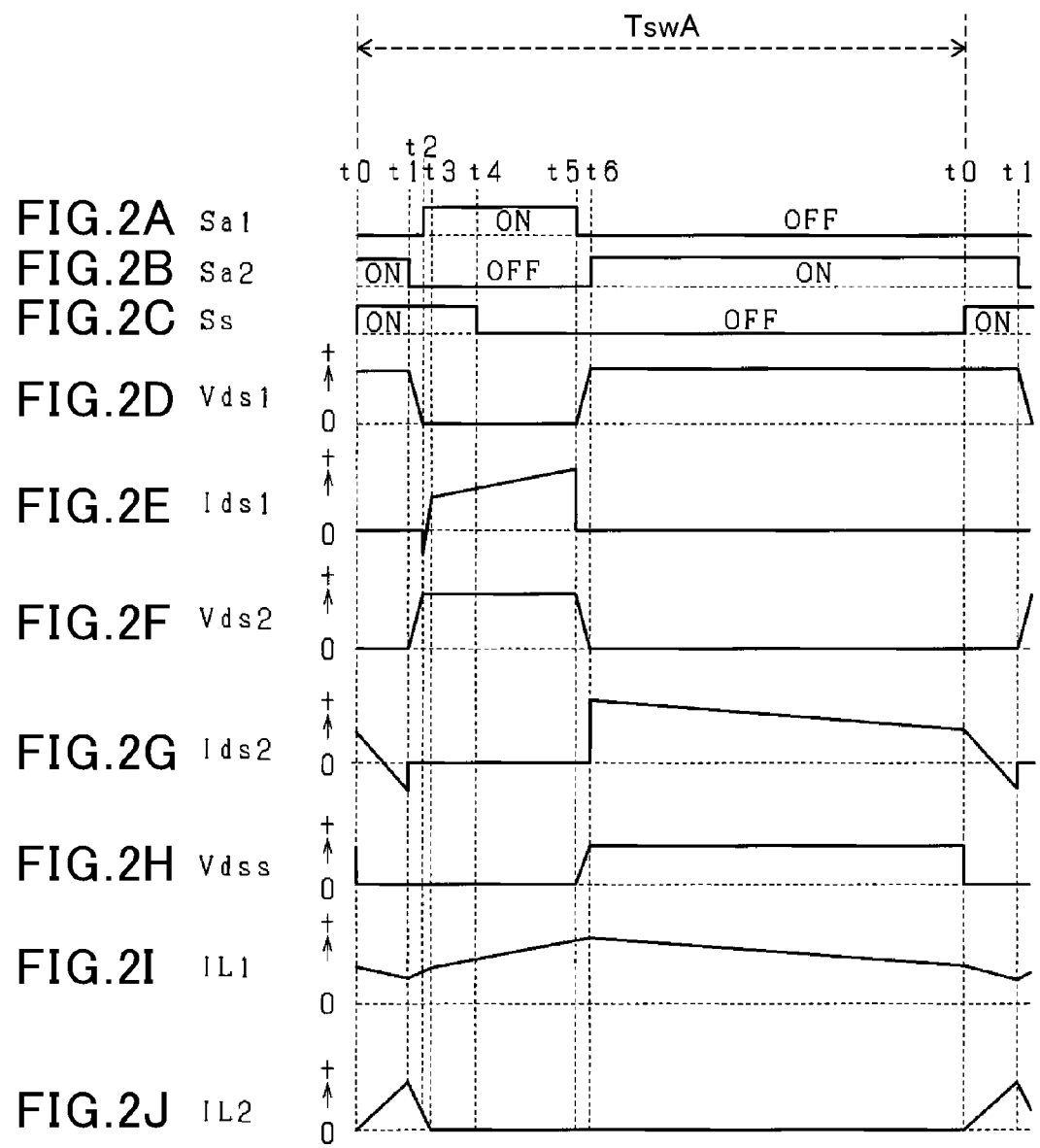
FIG. 2A to 2J are a joint timing chart schematically illustrating how predetermined parameters of the power converter change with time.
Figure 3:
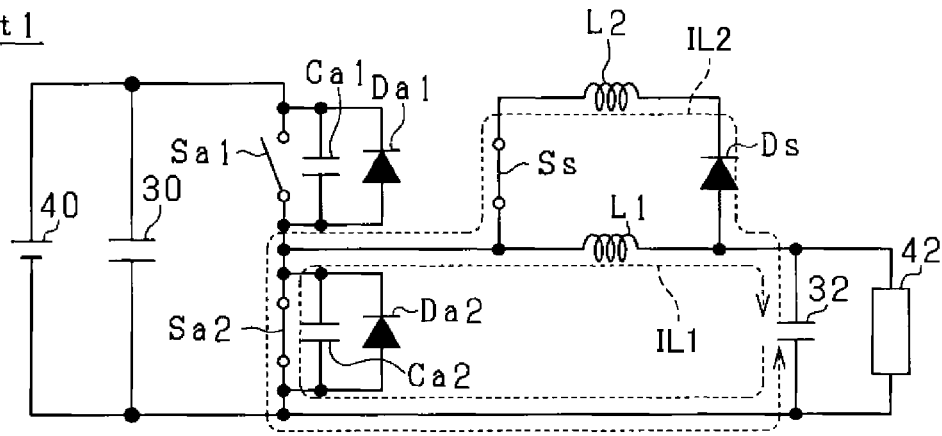
FIG. 3 is an equivalent circuit diagram schematically illustrating how the power converter operates in a first mode.
Figure 4:
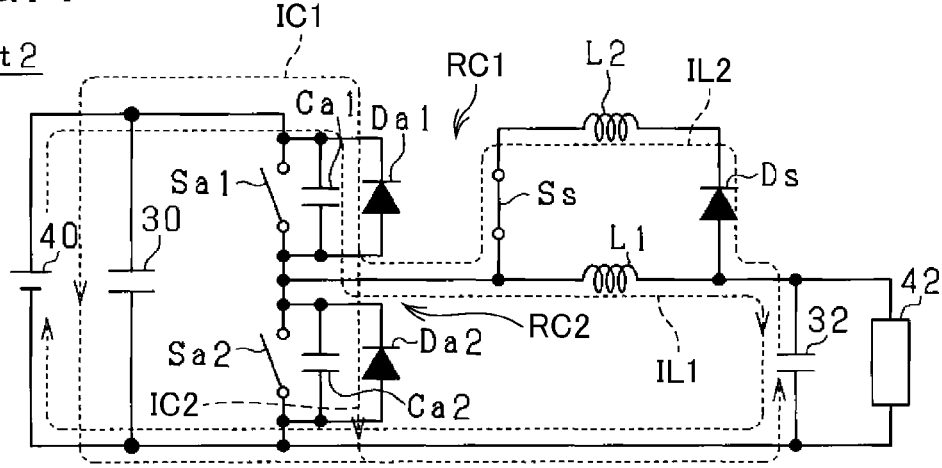
FIG. 4 is an equivalent circuit diagram schematically illustrating how the power converter operates in a second mode.
Figure 5:
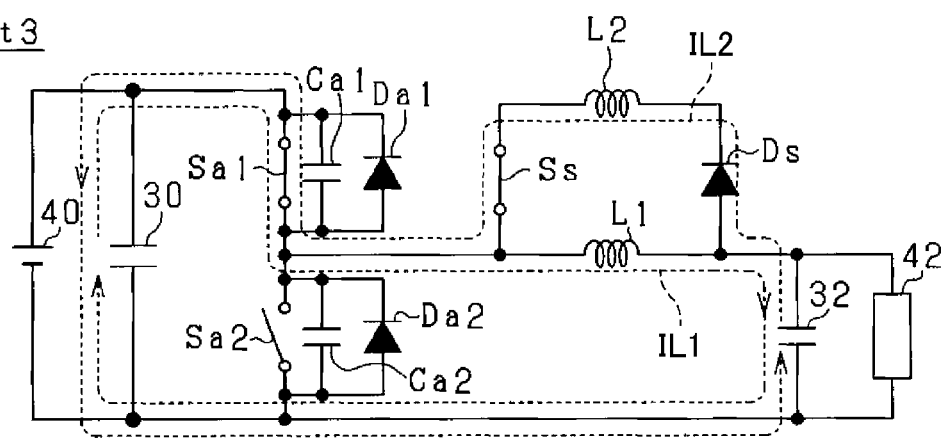
FIG. 5 is an equivalent circuit diagram schematically illustrating how the power converter operates in a third mode.

FIG. 3 is an equivalent circuit diagram schematically illustrating how the power converter 10 operates in a first mode within the period from time t0, which represents the start of a present switching period TswA of the auxiliary switch Ss, until just before time t1 illustrated in FIG. 2. FIG. 4 is an equivalent circuit diagram schematically illustrating how the power converter 10 operates in a second mode within the period from the time t1 until just before time t2 illustrated in FIG. 2. FIG. 5 is an equivalent circuit diagram schematically illustrating how the power converter 10 operates in a third mode within the period from the time t2 until just before time t3 illustrated in FIG. 2.

Figure 6:
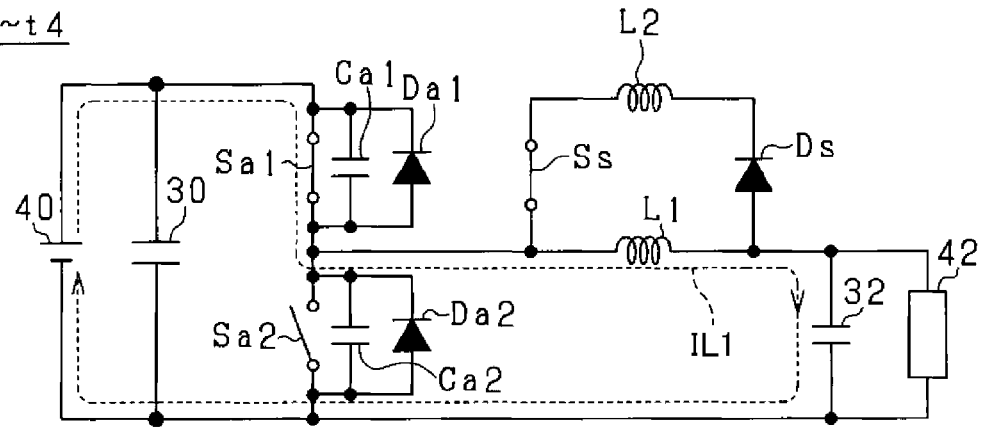
FIG. 6 is an equivalent circuit diagram schematically illustrating how the power converter operates in a fourth mode.
Figure 7:
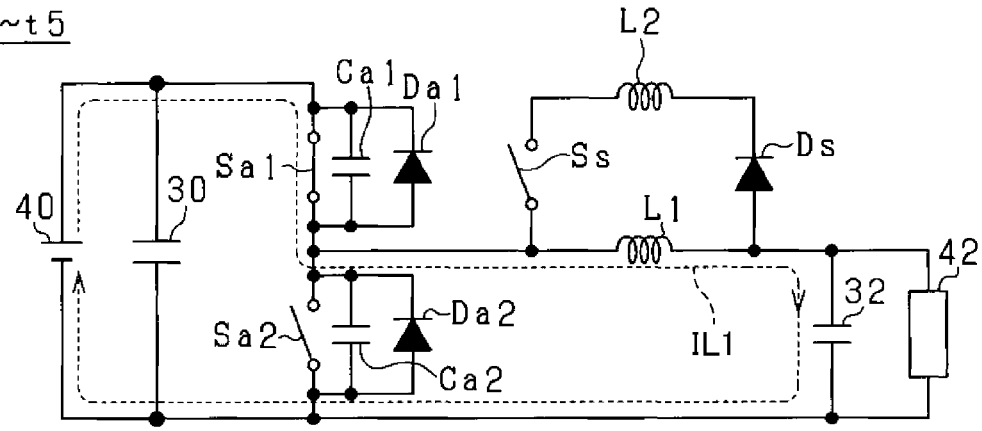
FIG. 7 is an equivalent circuit diagram schematically illustrating how the power converter operates in a fifth mode.
Figure 8:
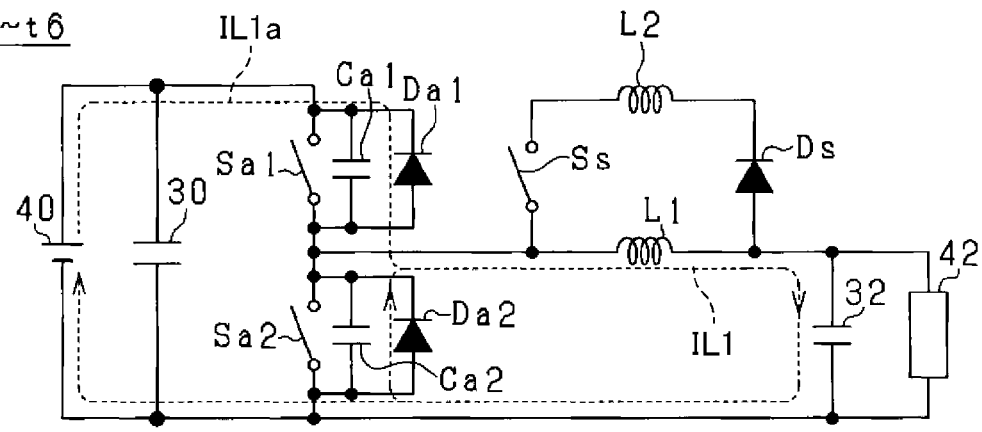
FIG. 8 is an equivalent circuit diagram schematically illustrating how the power converter operates in a sixth mode.
Figure 8A:
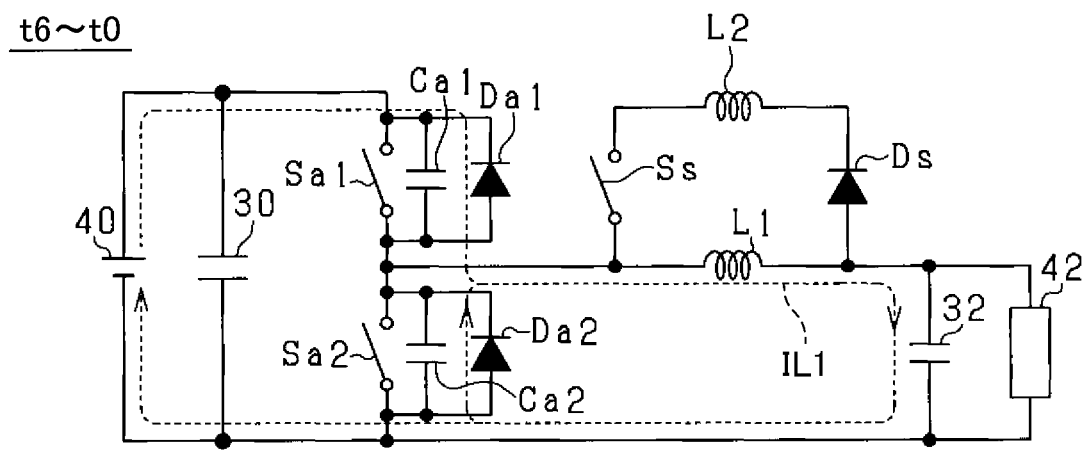
FIG. 8A is an equivalent circuit diagram schematically illustrating how the power converter operates in a seventh mode.

FIG. 6 is an equivalent circuit diagram schematically illustrating how the power converter 10 operates in a fourth mode within the period from the time t3 until just before time t4 illustrated in FIG. 2. FIG. 7 is an equivalent circuit diagram schematically illustrating how the power converter 10 operates in a fifth mode within the period from the time t4 until just before time t5 illustrated in FIG. 2. FIG. 8 is an equivalent circuit diagram schematically illustrating how the power converter 10 operates in a sixth mode within the period from the time t5 until just before time t6 illustrated in FIG. 2. FIG. 8A is an equivalent circuit diagram schematically illustrating how the power converter 10 operates in a seventh mode within the period from the time t6 until just before time t0, which represents the start of a next switching period TswA of the auxiliary switch Ss.

Note that the illustration of the diode Dt is eliminated in each of FIGS. 3 to 8A.

First Mode

As illustrated in FIG. 3, the auxiliary switch Ss is turned on while the first main switch Sa1 is kept off and the second main switch Sa2 is kept on under control of the controller 50 at the start of a present switching period TswA of the auxiliary switch Ss.

In the first mode of the power converter 10 within the period from the time t0 to the time t1, the first current IL1 based on the electromagnetic energy that has been charged in the main inductor L1 flows as the flyback current from the main inductor L1 through the smoothing capacitor 32 and the second main switch Sa2.

Additionally, the first mode enables a closed circuit including the second main switch Sa2, the smoothing capacitor 32, and the auxiliary circuit 20 to be established, so that the second current IL2 flows to gradually increase through the closed loop based on the electromagnetic energy that has been stored in the smoothing capacitor 32. This results in electromagnetic energy being stored in the resonance inductor L2. Because the inductance of the resonance inductor L2 is set to be sufficiently smaller than the inductance of the main inductor L1, the second current IL2 rapidly rises in a short time.

In the first mode, a gradual increase in the second current IL2 flowing from the resonance inductor L2 to the second main switch Sa2 causes the drain current Ids2 to gradually decrease, so that the drain current Ids2 has decreased to be lower than zero. Turning off the second main switch Sa2 with its drain current Ids2 being lower than zero at the time t1 therefore enables turn-off loss of the second main switch Sa2 to be reduced.

Second Mode

When the second main switch Sa2 is turned off at the time t1 at the time t1 so that both the first and second main switches Sa1 and Sa2 are off during a dead time, the first mode of the power converter 10 is shifted to the second mode as illustrated in FIG. 4.

The second mode of the power converter 10 within the dead time from the time t1 to the time t2 enables (1) The resonance inductor L2 and the first main capacitor Ca1 to constitute a series resonance circuit RC1 through the auxiliary switch Ss being on (2) The resonance inductor L2 and the second main capacitor Ca2 to constitute a series resonance circuit RC2 through the auxiliary switch Ss being on.

Each of the resonant circuit RC1 and RC2 is connected to the high-side output terminal Tpout by a first electrical path P1 including the auxiliary diode Ds.

Each of the resonant circuit RC1 and RC2 results in the resonance inductor L2 resonating with the corresponding one of the first and second main capacitors Ca1 and Ca2. This resonance based on the resonant circuit RC1 causes the electrical charge, which has been stored in the first main capacitor Ca1, to be discharged, so that the voltage across the first main capacitor Ca1 decreases. This results in the drain-source voltage Vds1 of the first main switch Sa1 decreasing down to zero at the time t2. Turning on the first main switch Sa1 with its drain-source voltage Vds1 being zero at the time t2 enables the ZVS control of the first main switch Sa1 to be carried out, thus reducing turn-on loss of the first main switch Sa1.

This resonance also causes the second current IL2 to be divided into two currents Ic1 and Ic2 respectively flowing through the first and second main capacitors Ca1 and Ca2.

Turning off the second main switch Sa2 at the timing when the second current IL2 satisfies the predetermined condition defined by the following equation (1) enables the ZVS control of the second main switch Sa2 to be carried out:

$$IL2 > IL1 + \sqrt{\frac{Ca1 + Ca2}{L2}(Vds1^2 - Vds2^2)} \quad (1)$$

Where C1a and C2a in the equation (1) represent the capacitances of the respective first and second main capacitors Ca1 and Ca2, and L2 in the equation (1) represents the inductance of the resonance inductor L2. As another example, turning off the second main switch Sa2 at the timing when the length, which is expressed by reference character Ts, of the period from the time t0 to the time t1 satisfies the predetermined condition defined by the following equation (2) enables the ZVS control of the second main switch Sa2 to be carried out:

$$Ts > \frac{L2}{Vds2}\left(\sqrt{\frac{Ca1 + Ca2}{L2}(Vds1^2 - Vds2^2)}\right) \quad (2)$$

Third Mode

When the first main switch Sa1 is turned on at the time t2, the second mode of the power converter 10 is shifted to the third mode as illustrated in FIG. 5. In the third mode of the power converter 10 within the period from the time t2 to the time t3, the remaining electromagnetic energy stored in the resonance inductor L2 is discharged to the high- and low-side input terminals Tpin and Tnin so as to decrease down to zero.

The auxiliary circuit 20 is capable of reducing the level of a surge voltage resulting from when the first main switch Sa1 is turned on at the time t2. Specifically, the divided current Ic2 flowing through the resonance inductor L2 toward the second flyback diode Da2 cancels the flyback current, i.e. the first current IL1, trying to flow through the main inductor L1 and the second flyback diode Da2. This enables, even if the first main switch Sa1 is tuned on at the time t2 so that a reverse voltage is applied across the second flyback diode Da2, the level of a surge voltage caused due to the reverse recovery current from the flyback diode Da2 to be reduced.

Fourth Mode

When the resonance causes the second drain-source voltage Vds2 to reach the input voltage Vin so that the first drain-source voltage Vds1 becomes zero, the second current IL2 does not flow through the auxiliary circuit 20 at the time t3, terminating the resonance. This results in the third mode of the power converter 10 being shifted to the fourth mode as illustrated in FIG. 6. In the fourth mode of the power converter 10 within the period from the time t3 to the time t4, the DC power source 40 causes a current to flow through the main inductor L1 as the first current IL1 via the first main switch Sa1, so that electromagnetic energy based on the first current IL1 is stored in the main inductor L1. Because the auxiliary diode Ds is reverse biased with respect to the direction of the first current IL1 through the auxiliary circuit 20, no current flow through the auxiliary circuit 20 is maintained.

Fifth Mode

When the auxiliary switch Ss is turned off at the time t4, the fourth mode of the power converter 10 is shifted to the fifth mode as illustrated in FIG. 7. In the fifth mode of the power converter 10 within the period from the time t4 to the time t5, the DC power source 40 causes a current to flow through the main inductor L1 as the first current IL1 via the first main switch Sa1 in the same manner as the fourth mode.

As described above, the auxiliary switch Ss is turned off while no current flows through the auxiliary circuit 20, enabling the ZVS control of the auxiliary switch Ss to be carried out. This results in turn-off switching loss of the auxiliary switch Ss being minimized, thus avoiding the occurrence of a surge voltage from the auxiliary switch Ss at the turn-off of the auxiliary switch Ss.

Sixth Mode

When the first main switch Sa1 is turned off at the time t5, the fifth mode of the power converter 10 is shifted to the sixth mode as illustrated in FIG. 8. In the sixth mode of the power converter 10 within the period from the time t5 to the time t6, the flyback current IL1 flows through the main inductor L1, and a current IL1a based on the DC power source 40 flows through the first main capacitor Ca1. This charges the first main capacitor Ca1, so that the drain-source voltage Sa1 increases whereas the drain-source voltage Vds2 of the second switch Sa2 decreases due to turn-off of the first main switch Sa1. When the drain-source voltage Vds1 reaches the input voltage Vin output from the DC power source 40, the drain-source voltage Vds2 of the second main switch Sa2 becomes zero at the time t6 in the same manner as a typical step-down DC-DC converter.

Seventh Mode

When the second main switch Sa2 is turned on at the time t6, the sixth mode of the power converter 10 is shifted to the seventh mode as illustrated in FIG. 8A. That is, the seventh mode of the power converter 10 is within the period from the time t6 of the present switching period TswA to the time t0 of the next switching period TswA.

In the seventh mode, the first current IL1 based on the electromagnetic energy that has been charged in the main inductor L1 flows as the flyback current from the main inductor L1 through the smoothing capacitor 32 and the second main switch Sa2 in the same manner as a typical step-down DC-DC converter. Because the auxiliary switch Ss is off in the seventh mode, no current flows through the auxiliary circuit 20.

The timing to switch the second main switch Sa2 from the off state to the on state at the start of the seventh mode can be determined to the timing when a time Tset has elapsed since the immediately close turn-off time t5 of the first main switch Sa1; the time Tset is defined in accordance with the following equation (3):

$$Tset = (Ca1 + Ca2)\frac{Vin}{IL1} \quad (3)$$

Note that the value of the first current IL1 measured by the first current sensor 46 can be used as the value of the first current IL1 flowing through the main inductor L1 expressed in the equation (3).

When the present switching period TswA has elapsed since its start time t0, the seventh mode is switched to the first mode of the power converter 10 in the next switching period TswA as illustrated in FIG. 3.

Note that the controller 50 can turn on the auxiliary switch Ss at the start of the first mode under hard switching control, i.e. without using the ZVS control. Specifically, switching of each of the first and second main switches Sa1 and Sa2 is carried out within the range from zero to the input voltage Vin. In contrast, switching of the auxiliary switch Ss is carried out between zero and the output voltage Vout. Because the output voltage Vout of the step-down converter 10 is constantly lower than the input voltage thereof, a switching element having a lower breakdown voltage and lower switching loss can be used as the auxiliary switch Ss.

In addition, the controller 50 is capable of switching the auxiliary switch Ss based on the ZVS control, resulting in lower switching loss of the auxiliary switch Ss. Moreover, because the drain-source voltage Vdss of the auxiliary switch Ss is sufficiently low, switching loss of the auxiliary switch Ss is maintained at low level.

In particular, if the auxiliary switch Ss were switched from the on state to the off state during the period from the time t0 to the time t3 due to noise, the second current IL2 flowing through the auxiliary switch Ss might decrease down to zero rapidly, resulting in a surge voltage occurring across the resonance inductor L2 in the direction to cause the second current IL2 to continuously flow, i.e. in the direction from its second end to its first end.

For avoiding such a situation, the power converter 10 according to the first embodiment includes a second electrical path, i.e. a bypass electrical path, P2 that shares a part of the first electrical path P1, and configured to enable a part of the second current IL2 to flow through the resonance inductor L2 while bypassing the auxiliary switch Ss.

Figure 9:
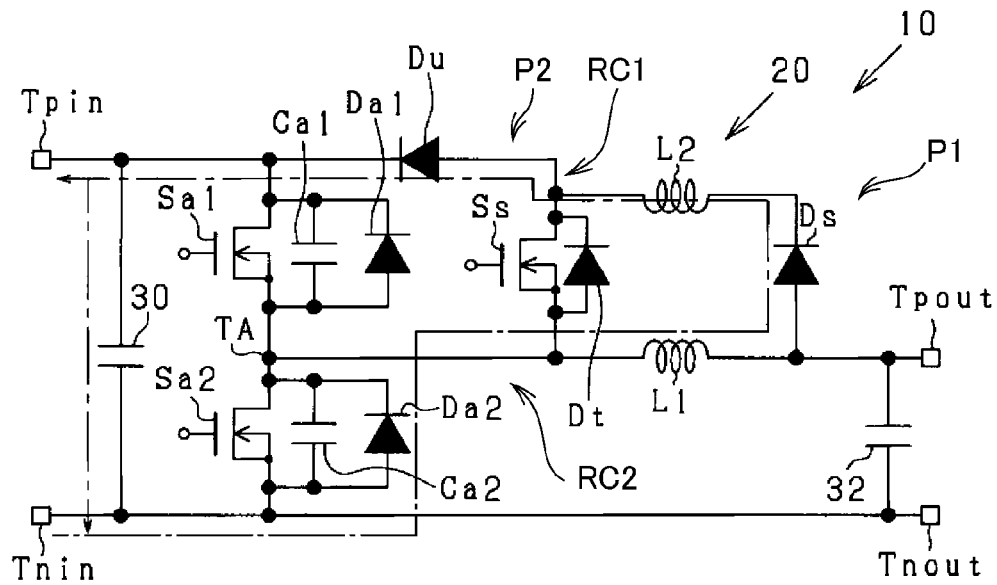
FIG. 9 is a circuit diagram schematically illustrating the principal components of the power converter illustrated in FIG. 1.

As illustrated by the dot-and-dash line in FIG. 9, the second electrical path P2 is configured to connect from the high-side input terminal Tpin to the low-side input terminal Tnin through the auxiliary inductor L2 while bypassing the auxiliary switch Ss.

Specifically, the second electrical path P2 connects from the first end of the auxiliary inductor L2, which is connected to the auxiliary switch Ss, to the high-side input terminal Tpin, and connects from the second end of the resonance inductor L2 to the low-side input terminal Tnin via the main inductor L1 and the second main capacitor Ca2.

The second electrical path P2 includes the diode Du provided thereon. Specifically, the anode of the diode Du is connected to the first end of the resonance inductor L2, and the cathode of the diode Du is connected to the high-side input terminal Tpin. The diode Du serves as a voltage limiter or a discharge unit, to limit the second current IL2 from flowing therethrough from the auxiliary inductor L2 to the high-side input terminal Tpin when the voltage across the resonance inductor L2 is lower than a predetermined threshold voltage. In other words, the diode Du serves as a current controller to enable the second current IL2 to flow therethrough from the auxiliary inductor L2 to the high-side input terminal Tpin when the voltage across the resonance inductor L2 is equal to or higher than the predetermined threshold voltage.

Specifically, the diode Du causes the second current IL2 to flow therethrough to the high-side input terminal Tpin when the voltage at the anode of the diode Du is higher than the voltage at the cathode of the diode Du.

The anode voltage of the diode Du is calculated based on the following steps. First, subtracting a forward voltage-drop value Vf across the auxiliary diode Ds from the output voltage Vout at the high-side output terminal Vpout obtains a value expressed by (Vout−Vf). Next, adding a voltage VL2 across the resonance inductor L2 to the obtained value (Vout−Vf) obtains a value expressed by (Vout−Vf+VL2), and subtracting, from the obtained value (Vout−Vf+VL2), the forward voltage-drop value Vf across the diode Du obtains the anode voltage (Vout−2Vf+VL2) of the diode Du. Note that the forward voltage-drop value Vf across the diode Ds is set to be equal to the forward voltage-drop value Vf across the diode Du.

That is, the anode voltage of the diode Du can be represented by the following equation (4):

$$Van=(Vout-2Vf+VL2) \qquad (4)$$

Where Van represents the anode voltage of the diode Du.

In addition, the cathode voltage of the diode Du corresponds to the input voltage Vin at the high-side input terminal Vpin. That is, when the anode voltage of the diode Du is higher than the cathode voltage of the diode Du, the anode voltage (Vout−2Vf+VL2) is higher than the input voltage Vin. That is, when the voltage VL2 across the resonance inductor L2 is higher than the value (Vin−Vout+2Vf), the diode Du is activated to cause the second current IL2 to flow therethrough to the high-side input terminal Tpin. Note that activation of the diode Du means that a current is enabled to flow therethrough.

In other words, the resonance inductor L2 is discharged when the voltage VL2 across the resonance inductor L2 is higher than the value (Vin−Vout+2Vf), so that the voltage VL2 across the resonance inductor L2 is maintained to be equal to or lower than the value (Vin−Vout+2Vf). Note that the value 2Vf represents the sum of the forward voltage-drop value Vf across the diode Ds and the forward voltage-drop value Vf across the diode Du.

That is, the diode Du limits the voltage VL2 applied across the resonance inductor L2 to be lower than the value (Vin−Vout+2Vf). This would protect the resonance inductor L2 and its peripheral element from a surge voltage even if the auxiliary switch Ss were switched from the on state to the off state while the second current IL2 flows through the resonance inductor L2.

As described in detail above, the power converter 10 according to the first embodiment is configured to turn on the auxiliary switch Ss to cause each of the resonant circuits RC1 and RC2, which is comprised of the resonance inductor L2 and the corresponding one of the first and second main capacitors Ca1 and Ca2. This causes resonance between the resonance inductor L2 and each of the first and second main capacitors Ca1 and Ca2. This resonance caused by each of the resonant circuits RC1 and RC2 enables the voltage across the corresponding one of the first and second main capacitors Ca1 and Ca2 to become substantially zero, and enables the first main switch Sa1 to be turned on while the voltage across the first main capacitor Ca1 is substantially zero. That is, the controller 50 performs the ZVS control of the first main switch Sa1 to turn on the first main switch Sa1, resulting in lower switching loss and lower noise at the switching of the first main switch Sa1.

If the auxiliary switch Ss were switched from the on state to the off state due to noise while the second current IL2 flows through the resonance inductor L2, the second current IL2 might rapidly fall. This might result in a surge voltage occurring across the resonance inductor L2.

For avoiding such a situation, the power converter 10 according to the first embodiment includes the bypass electrical path P2 configured to enable a part of the second current IL2 to flow through the resonance inductor L2 while bypassing the auxiliary switch Ss. That is, the bypass electrical path P2 enables the resonance inductor L2 to be discharged therethrough. This limits a voltage applied across the resonance inductor L2 to be lower than the predetermined value (Vin−Vout+2Vf), thus protecting the resonance inductor L2 and its peripheral elements from an overvoltage applied across the resonance inductor L2.

The second electrical path P2 is configured to connect among the high-side input terminal Tpin, the resonance inductor L2, and the low-side input terminal Tnin. This enables the electromagnetic energy charged in the resonance inductor L2 to be restored in the DC power source 40 and/or the smoothing capacitor 30, thus improving power efficiency of the power converter 10.

The auxiliary switch Ss is provided between the resonance inductor L2 and the connection point TA between the first and second main switches Sa1 and Sa2. The diode Du is provided between the high-side input terminal Tpin and the resonance inductor L2.

This simple configuration enables the electromagnetic energy to be restored in the DC power source 40 and/or the smoothing capacitor 30.

The power converter 10 includes the diode Du as an example of a passive element; the diode Du serves as a voltage limiter or a discharge unit that limits the second current IL2 from flowing therethrough from the auxiliary inductor L2 to the high-side input terminal Tpin when the voltage across the resonance inductor L2 is lower than the predetermined threshold voltage. That is, the configuration of the power converter 10 eliminates the need for the controller 50 to control the diode Du, resulting in the simpler configuration of the voltage limiter as compared with another voltage limiter comprised of a switch.

Second Embodiment

Figure 10:
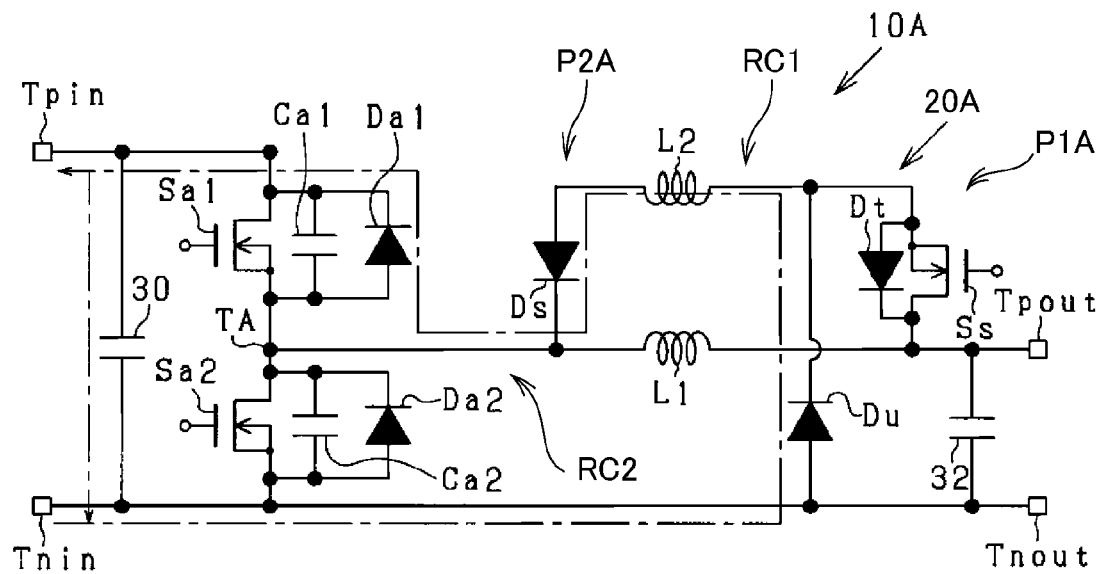
FIG. 10 is a circuit diagram schematically illustrating the principal components of a power converter according to the second embodiment of the present disclosure.

The following describes a power converter 10A according to the second embodiment of the present disclosure with reference to FIG. 10.

The structure and functions of the power converter 10A according to the second embodiment are slightly different from those of the power converter 10 according to the first embodiment by the following points. So, the different points will be mainly described hereinafter.

Referring to FIG. 10, the power converter 10A includes an auxiliary circuit 20A that is different from the auxiliary circuit 20.

Specifically, the first end of the resonance inductor L2 is connected to the anode of the auxiliary diode Ds, and the cathode of the auxiliary diode Ds is connected to the first end of the main inductor L1. The second end of the resonance inductor L2 is connected to the source of the auxiliary switch Ss, and the drain of the auxiliary switch Ss is connected to the second end of the main inductor L1. That is, the anode of the auxiliary diode Ds is connected to the high-side input terminal Tpin via the connection point TA and the first main switch Ca1.

Each of the resonant circuit RC1 and RC2 is connected to the high-side output terminal Tpout by a first electrical path P1A including the auxiliary switch Ss.

In addition, the power converter 10A includes a second electrical path, i.e. a bypass electrical path, P2A as illustrated by the dot-and-dash line in FIG. 10. The second electrical path P2A connects from the first end of the auxiliary inductor L2 to the high-side input terminal Tpin via the auxiliary diode Ds and the first flyback diode Da1, and connects from the second end of the resonance inductor L2 to the low-side input terminal Tnin.

The second electrical path P2A includes the diode Du provided thereon. The anode of the diode Du is connected to the low-side input terminal Tnin, and the cathode of the diode Du is connected to the second end of the auxiliary inductor L2.

The simple configuration of the power converter 10A illustrated in FIG. 10 enables the electromagnetic energy stored in the resonance inductor L2 to be restored in the DC power supply 40 and/or the smoothing capacitor 30.

Specifically, the diode Du causes the second current IL2 to flow therethrough to the high-side input terminal Tpin when the anode voltage of the diode Du is higher than the cathode voltage of the diode Du.

The anode voltage of the diode Du corresponds to the ground potential at the common signal ground line, i.e. the potential at the low-side output terminal Tnout.

Adding, to the input voltage Vin at the high-side input terminal Vpin, the forward voltage-drop value Vf across each of the first flyback diode Da1, the auxiliary diode Ds, and the diode Du obtains a value (Vin+3Vf). Then, subtracting, from the value (Vin+3Vf), the voltage VL2 across the resonance inductor L2 obtains the cathode voltage (Vin+3Vf−VL2) of the diode Du.

That is, the cathode voltage Vca of the diode Du can be represented by the following equation (5):

$$Vca = (Vin + 3Vf - VL2) \quad (5)$$

That is, when the anode voltage of the diode Du is higher than the cathode voltage of the diode Du, the anode voltage of 0V is higher than the cathode voltage (Vin+3Vf−VL2). That is, when the voltage VL2 across the resonance inductor L2 is higher than the value (Vin+3Vf), the diode Du is activated to cause the second current IL2 to flow therethrough to the high-side input terminal Tpin. Note that the value 3Vf represents the sum of the forward voltage-drop value Vf of the first flyback diode Da1, the forward voltage-drop value Vf across the diode Ds, and the forward voltage-drop value Vf across the diode Du. In other words, the resonance inductor L2 is discharged when the voltage VL2 across the resonance inductor L2 is higher than the value (Vin+3Vf), so that the voltage VL2 across the resonance inductor L2 is maintained to be equal to or lower than the value (Vin+3Vf). Note that the value 2Vf represents the sum of the forward voltage-drop value Vf across the diode Ds and the forward voltage-drop value Vf across the diode Du.

That is, the diode Du limits the voltage VL2 applied across the resonance inductor L2 to be lower than the value (Vin+3Vf). This would protect the resonance inductor L2 and its peripheral elements from a surge voltage even if the auxiliary switch Ss were switched from the on state to the off state while the second current IL2 flows through the resonance inductor L2. Accordingly, the power converter 10A achieves the same advantageous effects as those achieved by the power converter 10.

Third Embodiment

Figure 11:
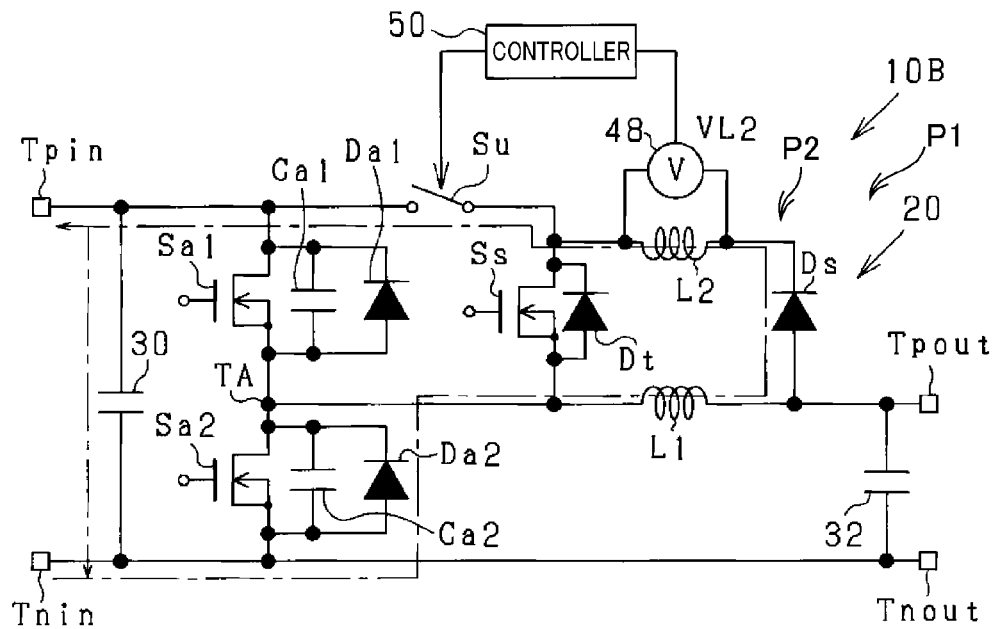
FIG. 11 is a circuit diagram schematically illustrating the principal components of a power converter according to the third embodiment of the present disclosure.

The following describes a power converter 10B according to the third embodiment of the present disclosure with reference to FIG. 11.

The structure and functions of the power converter 10B according to the third embodiment are slightly different from those of the power converter 10 according to the first embodiment by the following points. So, the different points will be mainly described hereinafter.

Referring to FIG. 11, the power converter 10B includes a switch Su in place of the diode Du serving as a voltage limiter or a discharge unit. Specifically, the switch Su is connected between the first end of the resonance inductor L2 and the high-side input terminal Tpin.

Additionally, the power converter 10B includes a voltage sensor 48 connected to the controller 50. The voltage sensor 48 serves as means for measuring the voltage VL2 across the resonance inductor L2, and for sending a signal indicative of the measured voltage VL2 across the resonance inductor L2 to the controller 50.

The controller 50 receives the voltage VL2 across the resonance inductor L2 based on the signal sent from the voltage sensor 48, and turns on the switch Su when the voltage VL2 across the resonance inductor L2 is equal to or higher than a predetermined threshold voltage. The bypass electrical path P2 enables the resonance inductor L2 to be discharged therethrough. This limits a voltage applied across the resonance inductor L2 to be lower than the predetermined threshold voltage, thus protecting the resonance inductor L2 and its peripheral elements from an overvoltage applied across the resonance inductor L2.

Figure 12:
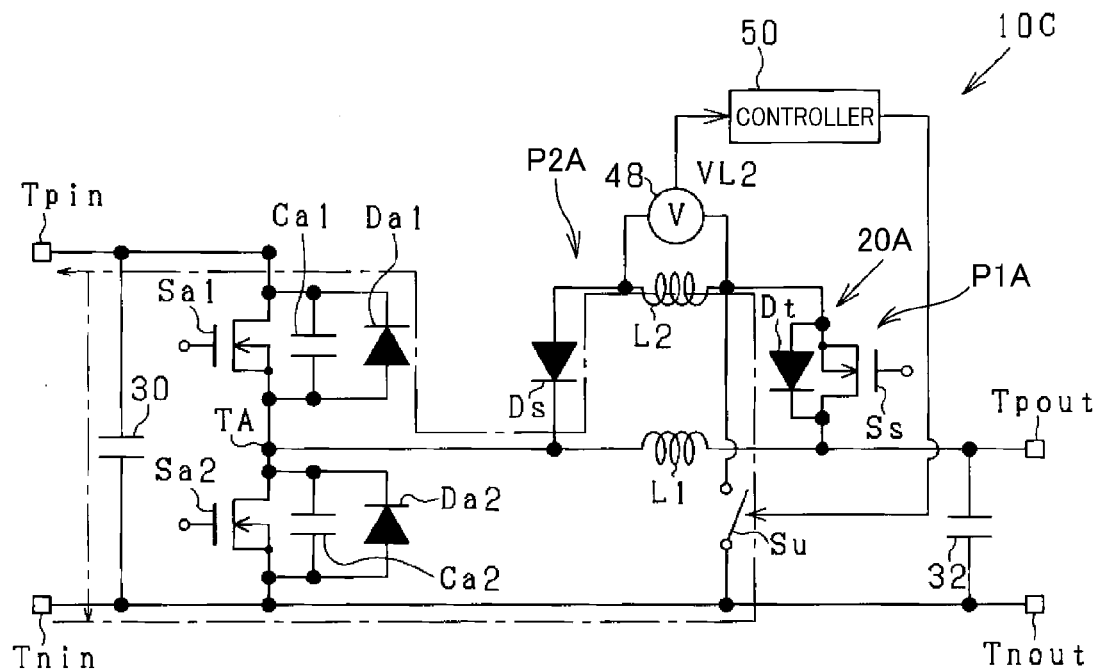
FIG. 12 is a circuit diagram schematically illustrating the principal components of a power converter according to a modification of the second embodiment of the present disclosure.

FIG. 12 illustrates a modification of the power converter 10A according to the second embodiment. That is, a power converter 10C according to the modification of the power converter 10A includes the switch Su in place of the diode Du serving as a voltage limiter or a discharge unit like the third embodiment. Specifically, the switch Su is connected between the low-side input terminal Tnin and the second end of the auxiliary inductor L2.

The power converter 10C includes the voltage sensor 48 connected to the controller 50. The voltage sensor 48 serves as means for measuring the voltage VL2 across the resonance inductor L2, and for sending a signal indicative of the measured voltage VL2 across the resonance inductor L2 to the controller 50.

The operations of the controller 50 of the power converter 10C are identical to those of the controller 50 of the power converter 10B.

Accordingly, each of the power converters 10B and 10C achieves advantageous effects that are substantially identical to those achieved by the power converter 10 except for the advantageous effect of using a passive element as the voltage limiter.

Fourth Embodiment

Figure 13:
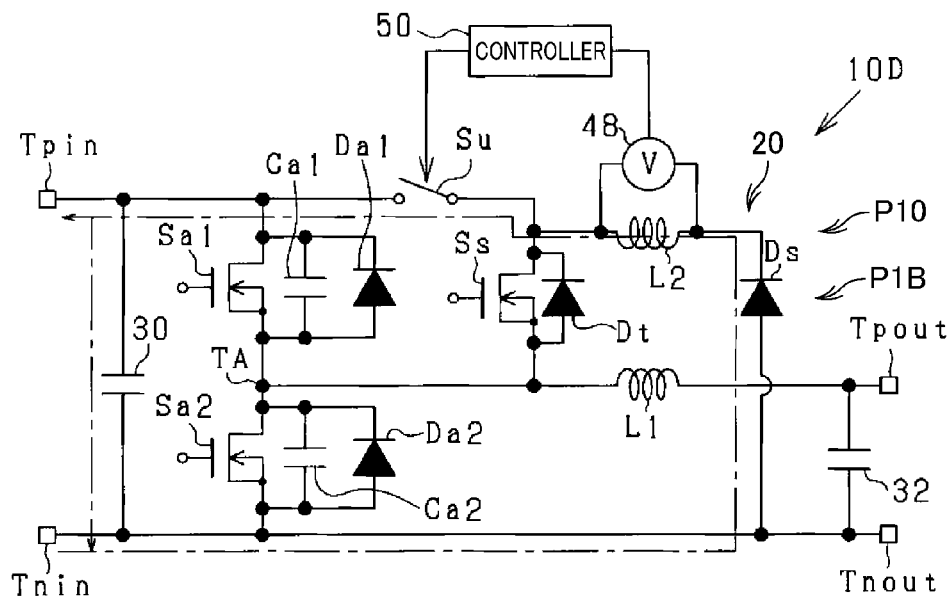
FIG. 13 is a circuit diagram schematically illustrating the principal components of a power converter according to the fourth embodiment of the present disclosure.

The following describes a power converter 10D according to the fourth embodiment of the present disclosure with reference to FIG. 13.

The structure and functions of the power converter 10D according to the fourth embodiment are slightly different from those of the power converter 10B according to the third embodiment by the following points. So, the different points will be mainly described hereinafter.

Referring to FIG. 13, the power converter 10D is configured such that the anode of the auxiliary diode Ds is connected not to the second end of the main inductor L1 but to the low-side output terminal Tnout via the common signal ground line.

That is, as illustrated by the dot-and-dash line in FIG. 13, the power converter 10D includes a first electrical path P1B including the auxiliary diode Ds and connecting between the second end of the resonance inductor L2 and the low-side output terminal Tnout. The power converter 10D also includes a second electrical path P10 that connects from the first end of the auxiliary inductor L2, which is connected to the auxiliary switch Ss, to the high-side input terminal Tpin via the switch Su. The second electrical path P10 also connects from the second end of the resonance inductor L2 to the low-side input terminal Tnin via the auxiliary diode Ds.

Like the third embodiment, the controller 50 receives the voltage VL2 across the resonance inductor L2 based on the signal sent from the voltage sensor 48, and turns on the switch Su when the voltage VL2 across the resonance inductor L2 is equal to or higher than the predetermined threshold voltage. The second electrical path P10 enables the resonance inductor L2 to be discharged therethrough. This limits a voltage applied across the resonance inductor L2 to be lower than the predetermined threshold voltage, thus protecting the resonance inductor L2 and its peripheral elements from an overvoltage applied across the resonance inductor L2.

Figure 14:
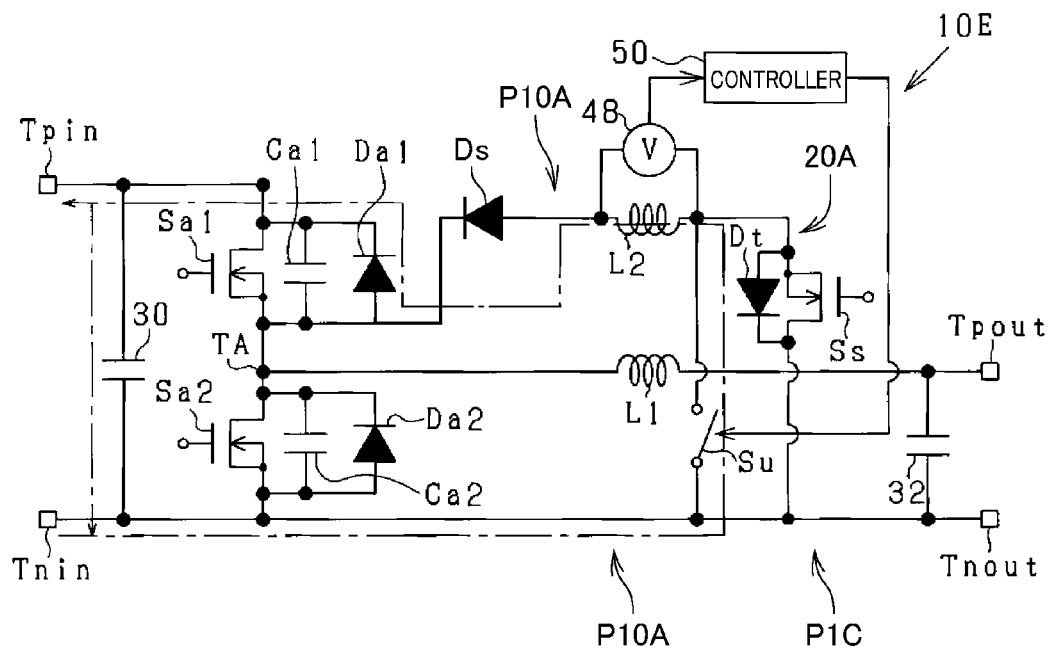
FIG. 14 is a circuit diagram schematically illustrating the principal components of a power converter according to a modification of the second embodiment of the present disclosure.

FIG. 14 illustrates a modification of the power converter 10A according to the second embodiment. That is, a power converter 10E according to the modification of the power converter 10A is configured such that the cathode of the auxiliary diode Ds is connected not to the first end of the main inductor L1 but to the high-side input terminal Tpin, which is similar to the fourth embodiment.

In addition, as illustrated by the dot-and-dash line in FIG. 14, the power converter 10E includes a first electrical path P1C including the auxiliary switch Ss and connecting between the second end of the resonance inductor L2 and the low-side output terminal Tnout. The power converter 10E also includes a second electrical path P10A that connects from the first end of the auxiliary inductor L2 to the high-side input terminal Tpin via the auxiliary diode Ds. The second electrical path P10A also connects from the second end of the resonance inductor L2 to the low-side input terminal Tnin via the switch Su.

The operations of the controller 50 of the power converter 10E are identical to those of the controller 50 of the power converter 10D.

Accordingly, each of the power converters 10D and 10E achieves advantageous effects that are substantially identical to those achieved by the power converter 10 except for the advantageous effect of using a passive element as the voltage limiter.

Fifth Embodiment

Figure 15:
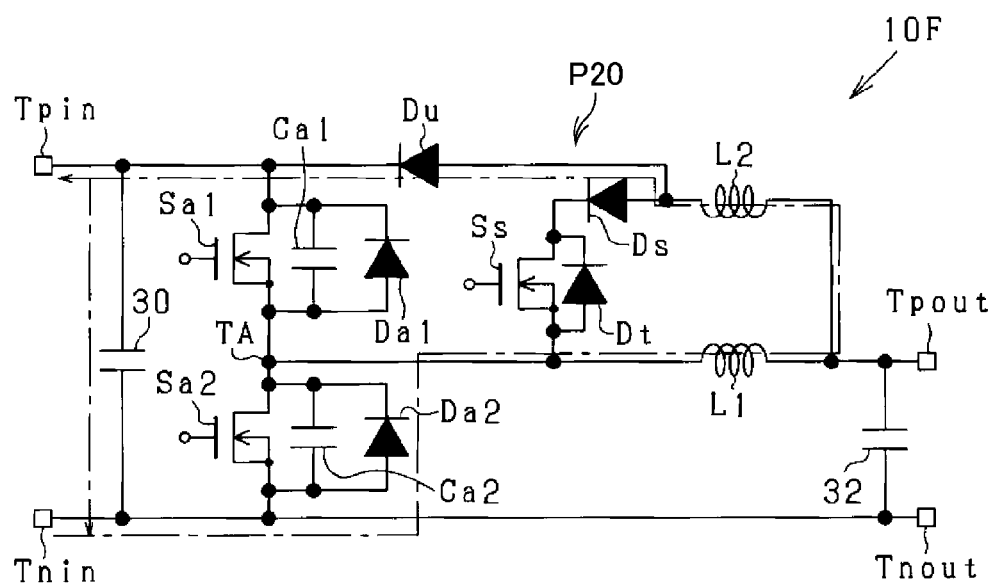
FIG. 15 is a circuit diagram schematically illustrating the principal components of a power converter according to the fifth embodiment of the present disclosure.

The following describes a power converter 10F according to the fifth embodiment of the present disclosure with reference to FIG. 15.

The structure and functions of the power converter 10F according to the fifth embodiment are slightly different from those of the power converter 10 according to the first embodiment by the following points. So, the different points will be mainly described hereinafter.

Referring to FIG. 15, the power converter 10F is configured such that the first end of the resonance inductor L2 is connected to the cathode of the auxiliary diode Ds, and the second end of the resonance inductor L2 is connected to the second end of the main inductor L1 and to the high-side output terminal Tpout. The cathode of the auxiliary diode Ds is connected to drain of the auxiliary switch Ss, and the source of the auxiliary switch Ss is connected to the connection point TA between the first and second main switches Sa1 and Sa2.

The anode of the diode Du, which serves as a voltage limiter or a discharge unit, is connected to the first end of the resonance inductor L2, and the cathode of the diode Du is connected to the high-side input terminal Tpin.

That is, as illustrated by the dot-and-dash line in FIG. 15, the power converter 10F includes a second electrical path P20 that directly connects the high-side input terminal Tpin and the first end of the resonance inductor L2 without going through the auxiliary switch Ss. The second electrical path P20 also connects from the second end of the resonance inductor L2 to the low-side input terminal Tnin via the main inductor L1 and the second main capacitor Ca2.

This enables the second current IL2 to flow through the second electrical path P20 without through the auxiliary diode Ds. This results in the second current IL flowing from the resonance inductor L2 through the high- and low-side input terminals Tpin and Tnin while bypassing the auxiliary diode Ds. This therefore prevents power loss from occurring from the auxiliary diode Ds, and prevents an overcurrent from flowing through the auxiliary diode Ds in addition to the advantageous effects achieved by the first embodiment.

Specifically, the diode Du is activated to cause the second current IL2 to flow therethrough to the high-side input terminal Tpin when the voltage VL2 across the resonance inductor L2 is higher than a predetermined value (Vin+2Vf). In other words, the resonance inductor L2 is discharged when the voltage VL2 across the resonance inductor L2 is higher than the value (Vin+2Vf), so that the voltage VL2 across the resonance inductor L2 is maintained to be equal to or lower than the value (Vin+2Vf). Note that the value 2Vf represents the sum of the forward voltage-drop value Vf across the diode Du and the forward voltage-drop value Vf across the first flyback diode Da1.

Figure 16:
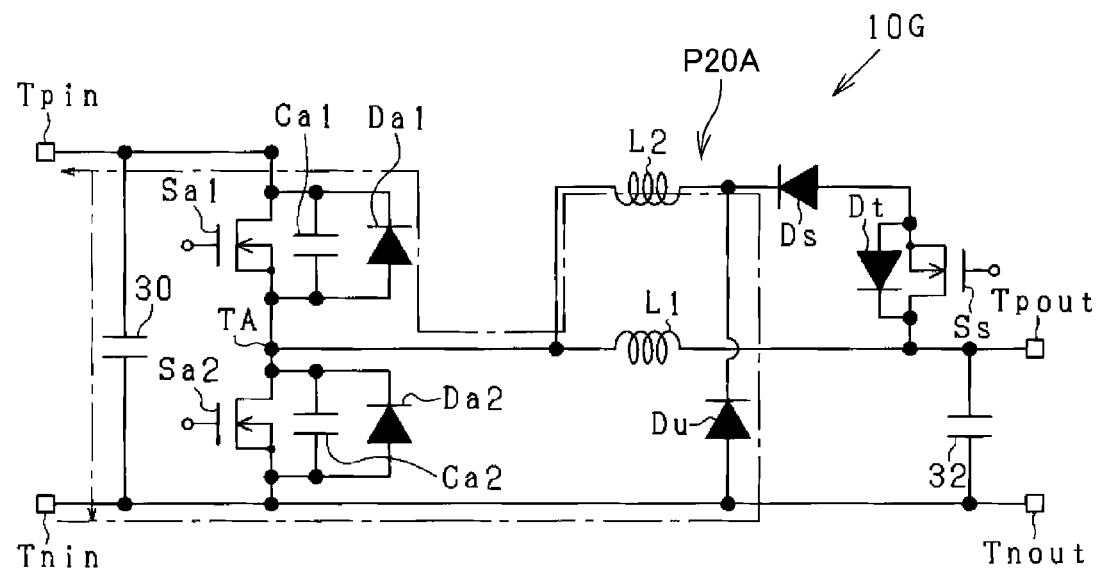
FIG. 16 is a circuit diagram schematically illustrating the principal components of a power converter according to a modification of the second embodiment of the present disclosure.

FIG. 16 illustrates a modification of the power converter 10A according to the second embodiment. That is, a power converter 10G according to the modification of the power converter 10A includes a second electrical path P20A as illustrated by the dot-and-dash line in FIG. 16, which is similar to the fifth embodiment.

The power converter 10G is configured such that the first end of the resonance inductor L2 is directly connected to the connection point TA, and the second end of the resonance inductor L2 is connected to the cathode of the auxiliary diode Ds. The anode of the auxiliary diode Ds is connected to the source of the auxiliary switch Ss.

That is, the second electrical path P20A connects from the first end of the auxiliary inductor L2 to the high-side input terminal Tpin via the first flyback diode Da1 without through the auxiliary diode Ds, and connects from the second end of the resonance inductor L2 to the low-side input terminal Tnin.

The second electrical path P20A includes the diode Du provided thereon. The anode of the diode Du is connected to the low-side input terminal Tnin, and the cathode of the diode Du is connected to the second end of the auxiliary inductor L2.

The power converter 10G enables the second current IL2 to flow through the second electrical path P20A without through the auxiliary diode Ds. This results in the second current IL flowing from the resonance inductor L2 through the high- and low-side input terminals Tpin and Tnin while bypassing the auxiliary diode Ds. This therefore prevents power loss from occurring from the auxiliary diode Ds, and prevents an overcurrent from flowing through the auxiliary diode Ds in addition to the advantageous effects achieved by the first embodiment.

Sixth Embodiment

Figure 17:
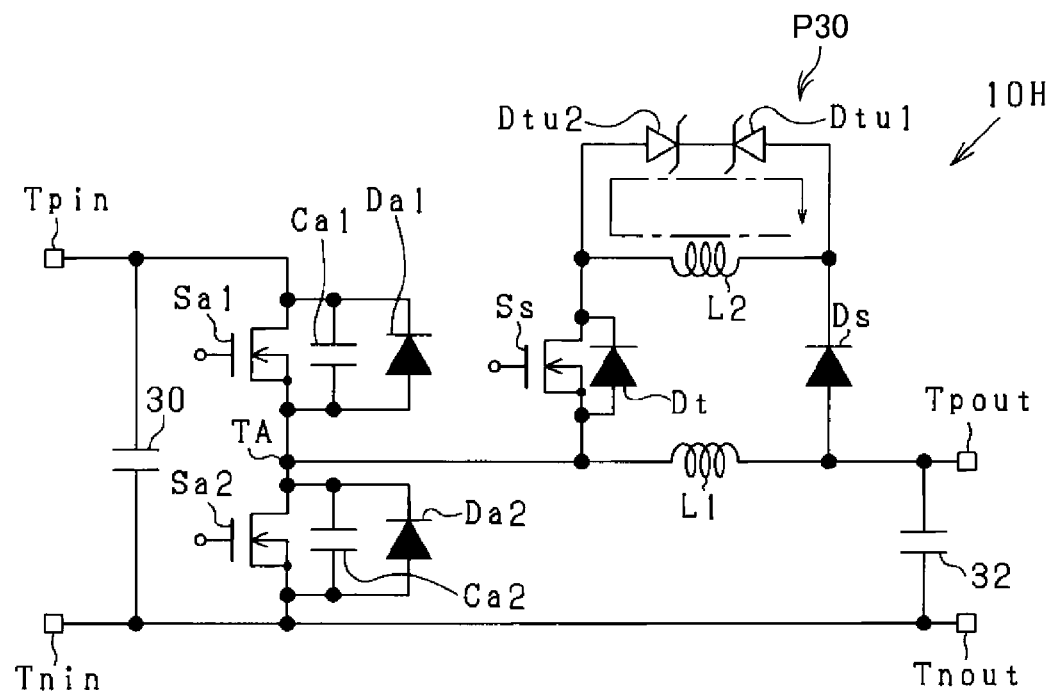
FIG. 17 is a circuit diagram schematically illustrating the principal components of a power converter according to the sixth embodiment of the present disclosure.

The following describes a power converter 10H according to the sixth embodiment of the present disclosure with reference to FIG. 17.

The structure and functions of the power converter 10H according to the sixth embodiment are slightly different from those of the power converter 10 according to the first embodiment by the following points. So, the different points will be mainly described hereinafter.

Referring to FIG. 17, the power converter 10H includes a second electrical path P30 as illustrated by the dot-and-dash line in FIG. 17.

Specifically, the second electrical path P30 connects both first and second ends of the resonance reactor L2, and enables a part of the second current IL2 to flow therethrough while bypassing the auxiliary switch Ss.

The second electrical path P30 includes a pair of Zener diodes Dtu1 and Dtu2, each of which serves as a voltage limiter or a discharge unit, provided thereon and connected in their opposite directions, i.e. in back to back fashion. Specifically, the anode of the Zener diode Dth1 is connected to the second end of the resonance inductor L2, and the cathode of the Zener diode Dth1 is connected to the cathode of the Zener diode Dth2. The anode of the Zener diode Dth2 is connected to the first end of the resonance inductor L2.

When a voltage higher than a predetermined breakdown voltage of the Zener diode Dth1 is applied to the Zener diode Dth1 in its reverse direction with the auxiliary switch Ss being off, the Zener diode Dth1 is activated. This enables the electromagnetic energy stored in the resonance inductor L2 to be discharged via the second electrical path P30 when the voltage VL2 across the resonance inductor L2 exceeds the breakdown voltage of the Zener diode Dth1 with the auxiliary switch Ss being off. Note that, even if a voltage higher than the breakdown voltage of the Zener diode Dth1 is applied to the Zener diode Dth1 in its reverse direction, no current flows through the second electrical path P30 with the auxiliary switch Ss being on. This is because all current IL2 flows through the auxiliary circuit 20.

Similarly, when a voltage higher than a predetermined breakdown voltage of the Zener diode Dth2 is applied to the Zener diode Dth2 in its reverse direction, the Zener diode Dth2 is activated. This enables the electromagnetic energy stored in the resonance inductor L2 to be discharged via the second electrical path P30 when the voltage VL2 across the resonance inductor L2 exceeds the breakdown voltage of the Zener diode Dth2.

This simple configuration of the power converter 10H enables the electromagnetic energy stored in the resonance inductor L2 to be discharged from the resonance inductor L2 even if an overvoltage is applied across the resonance inductor L2.

The power converter 10H illustrated in FIG. 17 includes the Zener diodes Dth1 and Dth2 whose cathodes are connected to each other, and whose anodes are connected to the respective second end and first end of the resonance inductor L2. The power converter 10H can be modified such that the anodes of the Zener diodes Dth1 and Dth2 are connected to each other, and the cathodes are connected to the respective second end and first end of the resonance inductor L2.

Figure 18:
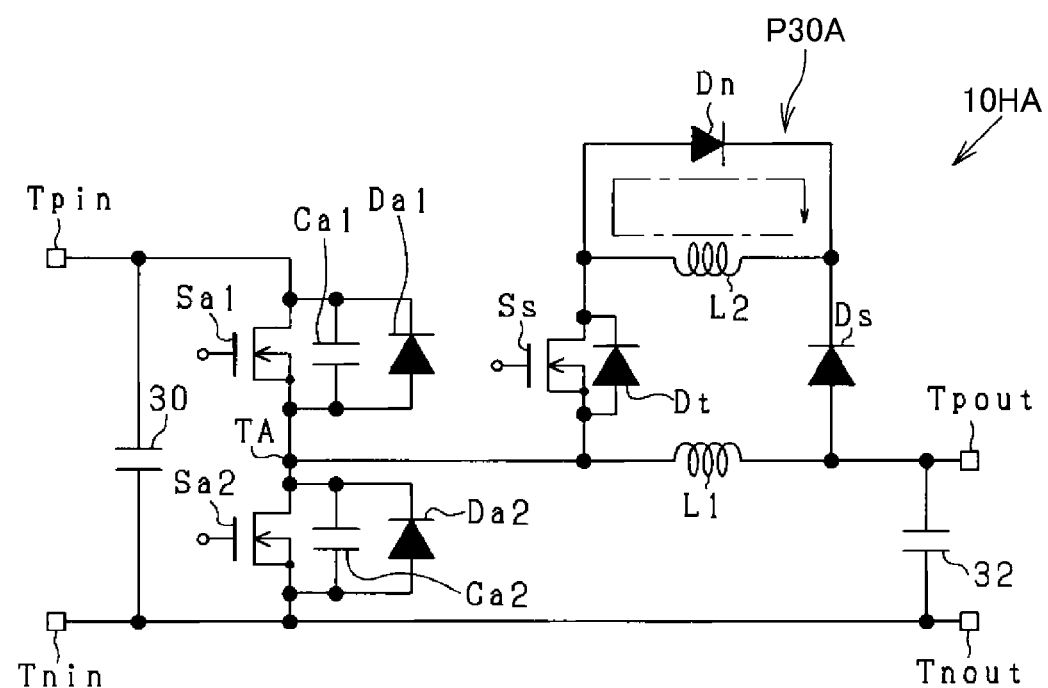
FIG. 18 is a circuit diagram schematically illustrating the principal components of a power converter according to a modification of the sixth embodiment of the present disclosure.

In addition, referring to FIG. 18, a modified power converter 10HA includes a second electrical path P30A as illustrated by the dot-and-dash line therein.

Specifically, the second electrical path P30A connects both first and second ends of the resonance reactor L2, and enables a part of the second current IL2 to flow therethrough while bypassing the auxiliary switch Ss.

The second electrical path P30A includes a diode Dn provided thereon. Specifically, the anode of the diode Zn is connected to the first end of the resonance inductor L2, and the cathode of the diode Dn is connected to the second end of the resonance inductor L2.

When a voltage higher than a predetermined forward voltage-drop value Vf of the diode Dn is applied to the diode Dn with the auxiliary switch Ss being off, the diode Dn is activated. This enables the electromagnetic energy stored in the resonance inductor L2 to be discharged via the second electrical path P30A when the voltage VL2 across the resonance inductor L2 exceeds the forward voltage-drop value with the auxiliary switch Ss being off. Note that, even if a voltage higher than the forward voltage-drop value Vf of the diode Dn is applied to the diode Dn, no current flows through the second electrical path P30A with the auxiliary switch Ss being on. This is because all current IL2 flows through the auxiliary circuit 20.

The simple configuration of the power converter 10HA enables the electromagnetic energy stored in the resonance inductor L2 to be discharged from the resonance inductor L2 even if an overvoltage is applied across the resonance inductor L2.

Accordingly, each of the power converters 10H and 10HA achieves advantageous effects that are substantially identical to those achieved by the power converter 10.

Seventh Embodiment

Figure 19:
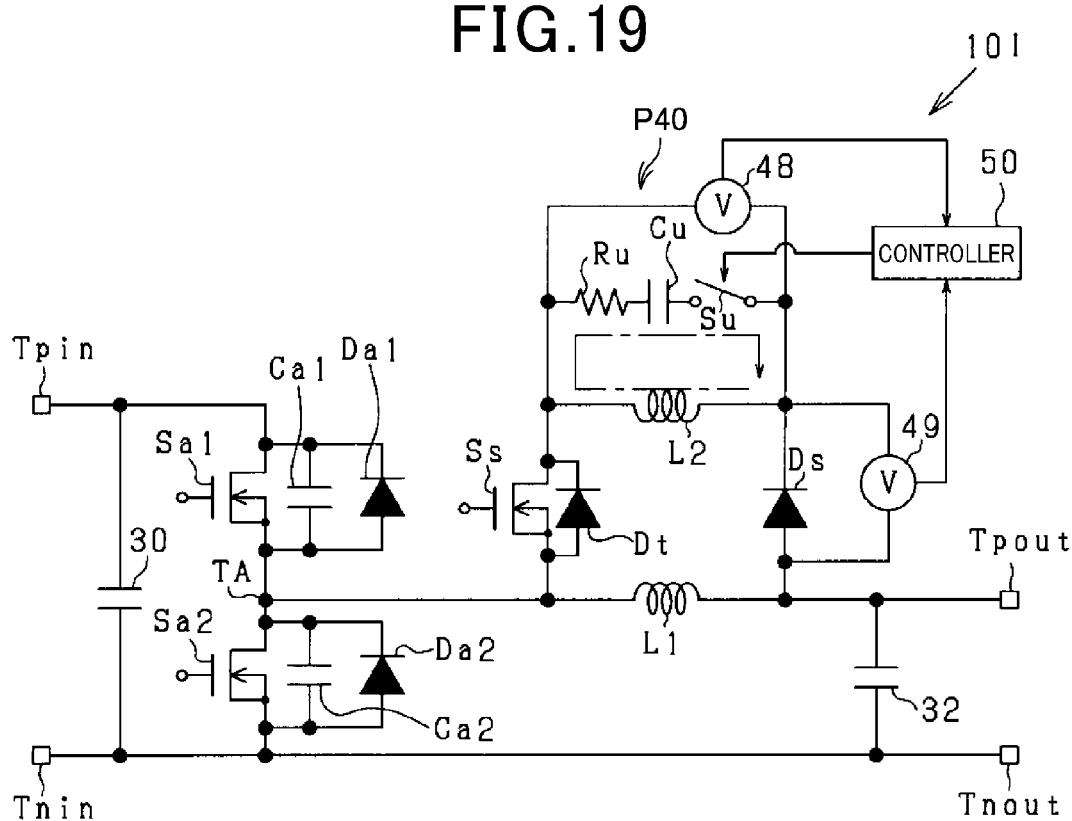
FIG. 19 is a circuit diagram schematically illustrating the principal components of a power converter according to the seventh embodiment of the present disclosure.

The following describes a power converter 10I according to the seventh embodiment of the present disclosure with reference to FIG. 19.

The structure and functions of the power converter 10I according to the seventh embodiment are slightly different from those of the power converter 10 according to the first embodiment by the following points. So, the different points will be mainly described hereinafter.

Referring to FIG. 19, the power converter 10I includes a second electrical path P40 as illustrated by the dot-and-dash line in FIG. 19.

Specifically, the second electrical path P40 connects both first and second ends of the resonance reactor L2, and enables a part of the second current IL2 to flow therethrough while bypassing the auxiliary switch Ss.

The second electrical path P40 includes a switch Su serving as a voltage limiter or a discharge unit, a capacitor Cu, and a resistor Ru, which are example of passive elements; these elements Su, Cu, and Ru are connected in series to each other. That is, the resistor Ru, capacitor Cu, and the switch Su serve as an active snubber 100.

The power converter 10I includes a voltage sensor 48A and a voltage sensor 49 connected to the controller 50. The voltage sensor 48A serves as means for measuring the voltage VL2 across the resonance inductor L2, and for sending a signal indicative of the measured voltage VL2 across the resonance inductor L2 to the controller 50. The voltage sensor 49 serves as means for measuring a voltage across the auxiliary diode Ds, and for sending a signal indicative of the measured voltage across the auxiliary diode Ds to the controller 50.

The controller 50 receives the voltage VL2 across the resonance inductor L2 based on the signal sent from the voltage sensor 48A, and receives the voltage across the auxiliary diode Ds based on the signal sent from the voltage sensor 49.

Then, the controller 50 turns on the switch Su when the voltage VL2 across the resonance inductor L2 is equal to or higher than a predetermined threshold voltage. The bypass electrical path P40 enables the resonance inductor L2 to be discharged therethrough, and the snubber circuit absorbs the discharged electromagnetic energy. This limits a voltage applied across the resonance inductor L2 to be lower than the predetermined threshold voltage, thus protecting the resonance inductor L2 and its peripheral elements from an overvoltage applied across the resonance inductor L2.

The controller 50 also turns on the switch Su when the voltage across the auxiliary diode Ds is equal to or higher than a predetermined threshold voltage. The bypass electrical path P40 enables the snubber circuit to absorb the voltage across the auxiliary diode Ds, which is equal to or higher than the predetermined threshold voltage. This limits a voltage applied across the auxiliary diode Ds to be lower than the predetermined threshold voltage, thus protecting the auxiliary diode Ds and its peripheral elements from an overvoltage applied across the auxiliary diode Ds.

The power converter 10I, which has a simple configuration, enables the electromagnetic energy stored in the resonance inductor L2 to be discharged, thus achieving advantageous effects that are substantially identical to those achieved by the power converter 10.

In particular, the active snubber 100 including the resistor Ru enables the electromagnetic energy stored in the resonance inductor L2 to be discharged more quickly as compared with an active snubber circuit including no resistors. The power converter 10I shares the active snubber 100 as means for discharging the electromagnetic energy stored in the resonance inductor L2 and means for absorbing an overvoltage applied across the auxiliary diode Ds. This protects the resonance inductor L2, the auxiliary diode Ds, and their peripheral elements from an overvoltage applied to them.

Eighth Embodiment

Figure 20:
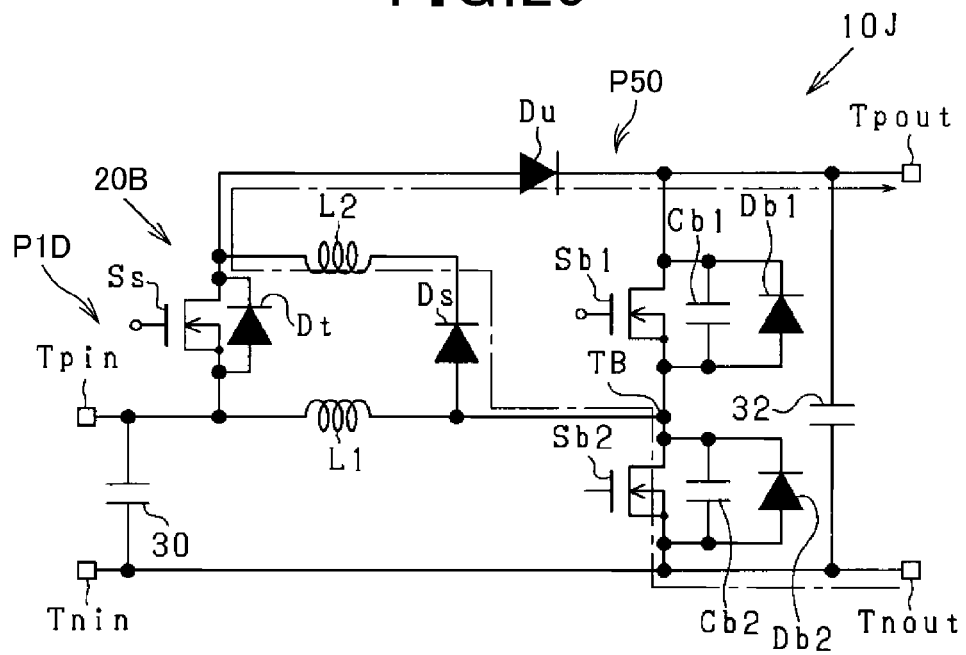
FIG. 20 is a circuit diagram schematically illustrating the principal components of a power converter according to the eighth embodiment of the present disclosure.

The following describes a power converter 10J according to the eighth embodiment of the present disclosure with reference to FIG. 20.

The structure and functions of the power converter 10J according to the eighth embodiment are slightly different from those of the power converter 10 according to the first embodiment by the following points. So, the different points will be mainly described hereinafter.

Referring to FIG. 20, the power converter 10J includes a first main switch Sb1, a second main switch Sb2, first and second main capacitors Cb1 and Cb2, and the main inductor L1. The power converter 10J includes the smoothing capacitor 30, an auxiliary circuit 20B, a diode Du serving as, for example, a voltage limiter or a discharge unit, and the controller 50, which is omitted in illustration in FIG. 20. The eighth embodiment uses an N-channel MOSFET as each of the switches Sb1 and Sb2.

Specifically, the drain of the first main switch Sb1 is connected to the high-side output terminal Tpout, and the source of the first main switch Sb1 is connected at a connection point TB to the drain of the second main switch Sb2. The source of the second main switch Sb2 is connected to the low-side output terminal Tnout.

The drain and source of each of the first and second main switches Sb1 and Sb2 serve as input and output terminals of the corresponding one of the first and second main switches Sb1 and Sb2.

The power converter 10J includes a first flyback diode Db1 connected across the first main switch Sb1 in antiparallel to the first main switch Sb1, and a second flyback diode Db2 connected across the second main switch Sb2 in antiparallel to the second main switch Sb2. An intrinsic diode of each of the first and second main switches Sb1 and Sb2 can serve as the corresponding one of the first and second flyback diodes Db1 and Db2. External diodes can be connected across the respective first and second main switches Sb1 and Sb2 as the first and second flyback diodes Db1 and Db2.

The first main capacitor Cb1 is connected across the first main switch Sb1 in parallel to the first main switch Sb1, and the second main capacitor Cb2 is connected across the second main switch Sb2 in parallel to the second main switch Sb2.

The main inductor L1 has opposing first and second ends. The first end of the main inductor L1 is connected to the connection point TB of the series-connected switches Sb1 and Sb2, and the second end of the main inductor L1 is connected to the positive electrode of the DC power source 40, which is omitted in illustration in FIG. 20.

The smoothing capacitor 30 is connected between the high- and low-side input terminals Tpin and Tnin. The smoothing capacitor 32 is connected between the high- and low-side output terminals Tpout and Tnout.

The high-side end of the smoothing capacitor 32 is connected to the high-side terminal of the electrical load 42, which is omitted in illustration in FIG. 20, via the high-side terminal Tpout. The low-side end of the smoothing capacitor 32 is connected to the source of the second main switch Sb2, and also connected to the low-side terminal of the electrical load 42 via the low-side terminal Tnout. That is, the smoothing capacitor 32 is connected in parallel to the electrical load 42.

Specifically, the power converter 10J, which serves as a step-up converter, is configured to step up the input voltage Vin input to the high- and low-side input terminals Tpin and Tnin, and output, as the output voltage Vout, the stepped-up voltage to the electrical load 42 via the high- and low-side output terminals Tpout and Tnout. Because the step-up operations of the power converter 10J are conventionally known, the description of the step-up operations are omitted.

The auxiliary circuit 20B includes the auxiliary diode Ds, the auxiliary switch Ss, and the resonance inductor L2 connected in series. The eighth embodiment uses an N-channel MOSFET as the auxiliary switch Ss. A diode Dt is connected across the auxiliary switch Ss in antiparallel to the auxiliary switch Ss. An intrinsic diode of the auxiliary switch Ss can serve as the diode Dt. An external diode can be provided to be connected across the auxiliary switch Ss as the diode Dt.

The resonance inductor L2 has opposing first and second ends. The first end of the resonance inductor L2 is connected to the drain of the auxiliary switch Ss, and the second end of the resonance inductor L2 is connected to the cathode of the auxiliary diode Ds. The anode of the auxiliary diode Ds is connected to the first end of the main inductor L1. The source of the auxiliary switching element Ss is connected to the second end of the main inductor L1.

The controller 50 periodically performs on-off switching operations of the first and second main switches Sb1 and Sb2. Specifically, the controller 50 complementarily turns on the first main switch Sb1 and the second main switch Sb2 with predetermined dead times between their on periods. The controller 50 also periodically performs on-off switching operations of the auxiliary switch Ss.

The controller 50 determines the switching period Tsw, which is comprised of a turn-on period Ton and a turn-off period Toff, for each of the first and second main switches Sb1 and Sb2 in accordance with the ratio of the output voltage Vout to the input voltage Vin.

Next, the following describes how the controller 50 controls the on-off switching operations of the auxiliary switch Ss.

Specifically, the controller 50 controls the on-off switching operations of the auxiliary switch Ss in the same manner as on-off switching operations of the auxiliary switch Ss according to the first embodiment when the first and second main switches Sb1 and Sb2 are regarded as the first and second main switches Sa1 and Sa2.

In addition, the controller 50 switches the auxiliary switch Ss from the off state to the on state while the second main switch Sb2 is on and the first main switch Sb1 is off. In addition, the controller 50 turns off the auxiliary switch Ss while the second main switch Sb2 is off and the first main switch Sb1 is on.

This switching control enables the second main switch Sb2 to be turned off with its drain current Ids2 being lower than zero, thus reducing turn-off loss of the second main switch Sb2. In addition, this switching control enables the first main switch Sb1 to be turned on with its drain-source voltage Vds1 being zero. That is, this enables the ZVS control of the first main switch Sb1 to be carried out, thus reducing turn-on loss of the first main switch Sb1.

The power converter 10J includes a first electrical path P1D including the auxiliary switch Ss and connecting between the first end of the resonance inductor L2 and the high-side input terminal Tpin. The power converter 10J also includes a second electrical path, i.e. a bypass electrical path, P50 as illustrated by the dot-and-dash line in FIG. 20. The second electrical path P50 connects from the high-side output terminal Tpout to the low-side output terminal Tnout through the auxiliary inductor L2 while bypassing the auxiliary switch Ss.

Specifically, the second electrical path P50 connects from the first end of the auxiliary inductor L2, which is connected to the auxiliary switch Ss, to the high-side output terminal Tpout, and connects from the second end of the resonance inductor L2 to the low-side output terminal Tnout via the auxiliary diode Ds and the second main capacitor Cb2.

The second electrical path P50 includes the diode Du provided thereon. Specifically, the anode of the diode Du is connected to the first end of the resonance inductor L2, and the cathode of the diode Du is connected to the high-side output terminal Tpout. The diode Du serves as a voltage limiter or a discharge unit, to limit the second current IL2 from flowing therethrough from the auxiliary inductor L2 to the high-side output terminal Tpout when the voltage VL2 across the resonance inductor L2 is lower than a predetermined threshold voltage. In other words, the diode Du serves as a current controller to enable the second current IL2 to flow therethrough from the auxiliary inductor L2 to the high-side output terminal Tpout when the voltage across the resonance inductor L2 is equal to or higher than the predetermined threshold voltage.

Specifically, the diode Du causes the second current IL2 to flow therethrough to the load 42 and the smoothing capacitor 32 via the high-side input terminal Tpin when the voltage at the anode of the diode Du is higher than the voltage at the cathode of the diode Du.

The anode voltage of the diode Du is calculated based on the sum of the voltage, referred to VCb2, across the smoothing capacitor Cb2, the forward voltage-drop value Vf across the auxiliary diode Ds, and the voltage VL2 across the resonance inductor L2. In particular, the voltage at the anode of the diode Du is equal to the input voltage Vin at the high-side input terminal Tpin when the auxiliary switch Ss is on.

In addition, the cathode voltage of the diode Du corresponds to the output voltage Vout at the high-side output terminal Vpout. That is, when the voltage VL2 across the resonance inductor L2 is higher than the value (Vout−VCb2−Vf), the diode Du is activated to cause the second current IL2 to flow therethrough to the high-side output terminal Tpout. In other words, the resonance inductor L2 is discharged when the voltage VL2 across the resonance inductor L2 is higher than the value (Vout−VCb2−Vf), so that the voltage VL2 across the resonance inductor L2 is maintained to be equal to or lower than the value (Vout−VCb2−Vf).

That is, the diode Du limits the voltage VL2 applied across the resonance inductor L2 to be lower than the value (Vout−VCb2−Vf). This would protect the resonance inductor L2 and its peripheral element from a surge voltage even if the auxiliary switch Ss were switched from the on state to the off state while the second current IL2 flows through the resonance inductor L2.

The second electrical path P50 is configured to connect among the high-side output terminal Tpout, the resonance inductor L2, and the low-side output terminal Tnout. This enables the electromagnetic energy charged in the resonance inductor L2 to be supplied to the electrical load 42 and the smoothing capacitor 32, thus improving power efficiency of the power converter 10J.

Accordingly, the power converter 10J achieves advantageous effects that are substantially identical to those achieved by the power converter 10.

Ninth Embodiment

Figure 21:
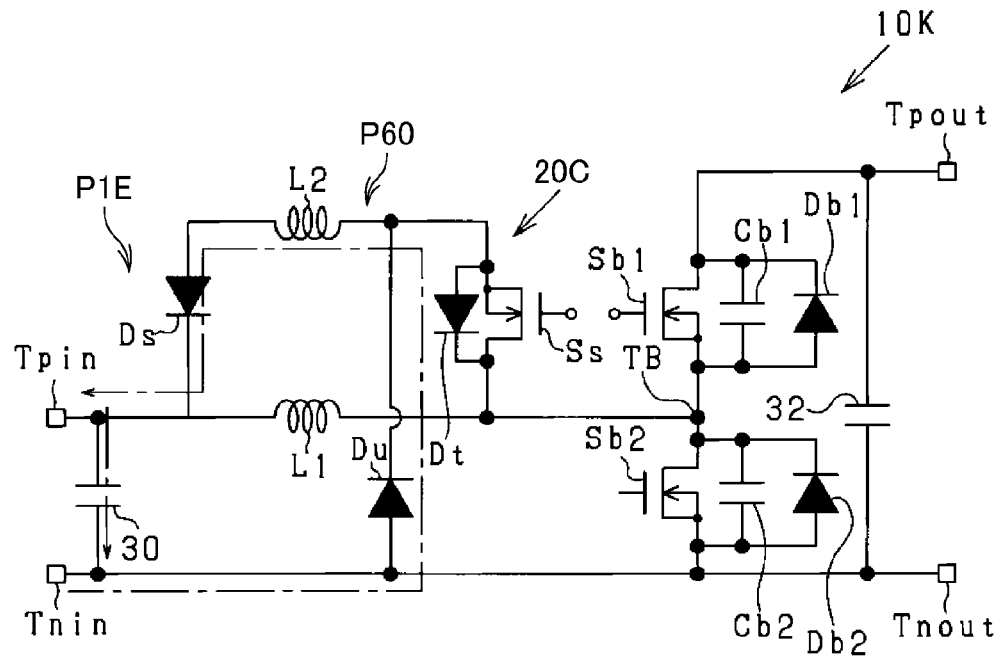
FIG. 21 is a circuit diagram schematically illustrating the principal components of a power converter according to the ninth embodiment of the present disclosure.

The following describes a power converter 10K according to the ninth embodiment of the present disclosure with reference to FIG. 21.

The structure and functions of the power converter 10K according to the ninth embodiment are slightly different from those of the power converter 10J according to the eighth embodiment by the following points. So, the different points will be mainly described hereinafter.

Referring to FIG. 21, the power converter 10K includes an auxiliary circuit 20C including the auxiliary diode Ds, the auxiliary switch Ss, and the resonance inductor L2 connected in series. A diode Dt is connected across the auxiliary switch Ss in antiparallel to the auxiliary switch Ss. An intrinsic diode of the auxiliary switch Ss can serve as the diode Dt. An external diode can be provided to be connected across the auxiliary switch Ss as the diode Dt.

The resonance inductor L2 has opposing first and second ends. The first end of the resonance inductor L2 is connected to the anode of the auxiliary diode Ds, and the cathode of the auxiliary diode Ds is connected to the high-side input terminal Tpin. The second end of the resonance inductor L2 is connected to the source of the auxiliary switch Ss, and the drain of the auxiliary switch Ss is connected to both the first end of the main inductor L1 and the connection point TB.

Specifically, the auxiliary switch Ss of the power converter 10K is provided between the resonance inductor L2 and the high-side input terminal Tpin via the main inductor L1.

The power converter 10K includes a first electrical path P1E including the auxiliary diode Ds and connecting between the first end of the resonance inductor L2 and the high-side input terminal Tpin. The power converter 10K also includes a second electrical path, i.e. a bypass electrical path, P60 including the diode Du as illustrated by the dot-and-dash line in FIG. 21. The second electrical path P60 connects from the high-side input terminal Tpin to the low-side input terminal Tnin through the auxiliary inductor L2 and the diode Du while bypassing the auxiliary switch Ss.

Specifically, the anode of the diode Du is connected to the low-side input terminal Tpin, and the cathode of the diode Du is connected to the second end of the resonance inductor L2. The second electrical path P60 connects from the first end of the auxiliary inductor L2 to the high-side input terminal Tpin via the auxiliary diode Ds, and connects from the second end of the resonance inductor L2 to the low-side input terminal Tnin via the diode Du.

Specifically, the diode Du causes the second current IL2 to flow to the high-side input terminal Tpin via the auxiliary diode Ds when the voltage at the anode of the diode Du is higher than the voltage at the cathode of the diode Du.

The anode voltage of the diode Du is the voltage at the low-side input terminal Tnin, i.e. zero. The cathode voltage of the diode Du is calculated based on the following steps. First, subtracting the forward voltage-drop value Vf across the auxiliary diode Ds from the input voltage Vin at the high-side input terminal Vpin obtains a value expressed by (Vin−Vf). Next, subtracting, from the value (Vin−Vf), the voltage VL2 across the resonance inductor L2 obtains a value expressed by (Vin−Vf−VL2), and subtracting, from the obtained value (Vin−Vf−VL2), the forward voltage-drop value Vf across the diode Du obtains the cathode voltage (Vin−2Vf−VL2) of the diode Du.

That is, when the anode voltage (0) of the diode Du is higher than the cathode voltage (Vin−2Vf−VL2) of the diode Du, which is expressed by 0>(Vin−2Vf−VL2), the diode Du is activated to cause the second current IL2 to flow therethrough to the high-side input terminal Tpin. When the input voltage Vin satisfies the following equation Vin<(2Vf+VL2), the resonance inductor L2 is discharged to the smoothing capacitor 30 and the DC power source 40. In other words, when the voltage VL2 across the resonance inductor L2 satisfies the following equation VL2>Vin−2Vf, the resonance inductor L2 is discharged to the smoothing capacitor 30 and the DC power source 40, so that the voltage VL2 across the resonance inductor L2 is maintained to be equal to or lower than the value (Vin−2Vf).

That is, the diode Du limits the voltage VL2 applied across the resonance inductor L2 to be lower than the value (Vin−2Vf). This would protect the resonance inductor L2 and its peripheral element from a surge voltage even if the auxiliary switch Ss were switched from the on state to the off state while the second current IL2 flows through the resonance inductor L2.

The second electrical path P60 is configured to connect among the high-side input terminal Tpin, the resonance inductor L2, and the low-side input terminal Tnin. This enables the electromagnetic energy charged in the resonance inductor L2 to be supplied to the DC power source 40 and the smoothing capacitor 30, thus improving power efficiency of the power converter 10K.

Accordingly, the power converter 10K achieves advantageous effects that are substantially identical to those achieved by the power converter 10.

Tenth Embodiment

Figure 22:
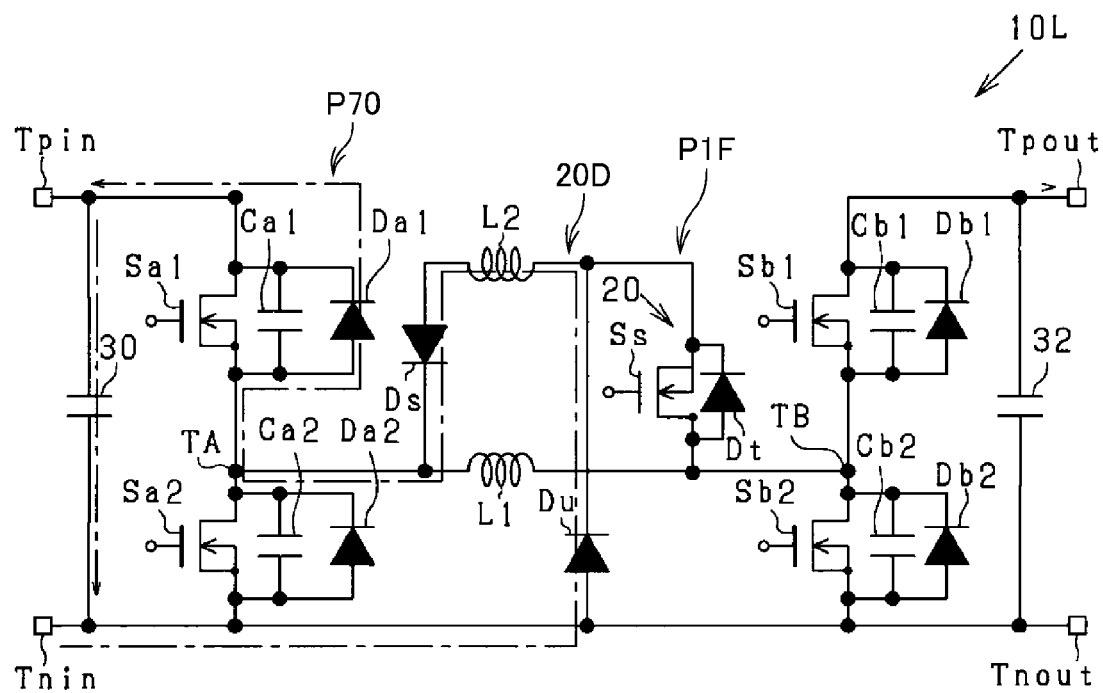
FIG. 22 is a circuit diagram schematically illustrating the principal components of a power converter according to the tenth embodiment of the present disclosure.

The following describes a power converter 10L according to the tenth embodiment of the present disclosure with reference to FIG. 22.

The structure and functions of the power converter 10L according to the tenth embodiment are slightly different from those of the power converter 10 according to the first embodiment by the following points. So, the different points will be mainly described hereinafter.

Referring to FIG. 22, the power converter 10L is designed as a buck-boost converter.

Specifically, the power converter 10L includes a first pair of main switches Sa1 and Sa2, a first pair of main capacitors Ca1 and Ca2, a second pair of main switches Sb1 and Sb2, a second pair of main capacitors Cb1 and Cb2, and an auxiliary circuit 20D. The power converter 10L also includes a diode Du serving as, for example, a voltage limiter or a discharge unit.

The drain of the first main switch Sa1 is connected to the positive terminal of the DC power source 40 via the high-side input terminal Tpin, and the source of the first main switch Sa1 is connected at the connection point TA to the drain of the second main switch Sa2. The source of the second main switch Sa2 is connected to the negative terminal of the DC power source 40 via the low-side input terminal Tnin.

In addition, the drain of the first main switch Sb1 is connected to the high-side output terminal Tpout, and the source of the first main switch Sb1 is connected at the connection point TB to the drain of the second main switch Sb2. The source of the second main switch Sb2 is connected to the low-side output terminal Tnout.

The power converter 10L includes a first pair of flyback diodes Da1 and Da2 and a second pair of flyback diodes Db1 and Db2. The flyback diode Da1 is connected across the first main switch Sa1 in antiparallel to the first main switch Sa1, and the second flyback diode Da2 is connected across the second main switch Sa2 in antiparallel to the second main switch Sa2. Similarly, the flyback diode Db1 is connected across the first main switch Sb1 in antiparallel to the first main switch Sb1, and the second flyback diode Db2 is connected across the second main switch Sb2 in antiparallel to the second main switch Sb2.

The main inductor L1 has opposing first and second ends. The first end of the main inductor L1 is connected to the connection point TA via the auxiliary diode Ds, and the second end of the main inductor L1 is connected to the connection point TB.

Specifically, the power converter 10J, which serves as a step-down converter, is configured to step down the input voltage Vin input to the high- and low-side input terminals Tpin and Tnin, and output, as the output voltage Vout, the stepped-down voltage to the electrical load 42 via the high- and low-side output terminals Tpout and Tnout. Because the step-down operations of the power converter 10L has been described in the first embodiment, the description of the step-down operations are omitted.

Specifically, the power converter 10L, which serves as a step-up converter, is configured to step up the input voltage Vin input to the high- and low-side input terminals Tpin and Tnin, and output, as the output voltage Vout, the stepped-up voltage to the electrical load 42 via the high- and low-side output terminals Tpout and Tnout. Because the step-up operations of the power converter 10L are conventionally known, the description of the step-up operations are omitted.

The power converter 10L includes a first electrical path P1F that includes the auxiliary switch Ss and is parallel to the line between the main inductor L1 and the connection point TB.

The auxiliary circuit 20D, which includes the auxiliary diode Ds, the auxiliary switch Ss, and the resonance inductor L2 connected in series, and the first electrical path P1F share the auxiliary switch Ss.

The resonance inductor L2 has opposing first and second ends. The first end of the resonance inductor L2 is connected to the anode of the auxiliary diode Ds, and the second end of the resonance inductor L2 is connected to the cathode of the diode Du. The anode of the diode Du is connected to the low-side input terminal Tnin. The cathode of the auxiliary diode Ds is connected to the connection point TA.

The controller 50 periodically performs on-off switching operations of the main switches Sa1 and Sa2 of the first pair. Specifically, the controller 50 complementarily turns on the main switches Sa1 and Sa2 of the first pair with predetermined dead times between their on periods while maintaining the main switches Sa1 and Sa2 in the off state, thus stepping down the input voltage Vin.

The controller 50 periodically performs on-off switching operations of the first and second main switches Sb1 and Sb2. Specifically, the controller 50 complementarily turns on the main switches Sb1 and Sb2 of the second pair with predetermined dead times between their on periods, thus stepping down the input voltage Vin. The controller 50 also periodically performs on-off switching operations of the auxiliary switch Ss.

The power converter 10L includes a second electrical path, i.e. a bypass electrical path, P70 as illustrated by the dot-and-dash line in FIG. 22. The second electrical path P70 connects from the high-side input terminal Tpin to the low-side input terminal Tnin through the auxiliary inductor L2 while bypassing the auxiliary switch Ss.

Specifically, the second electrical path P70 connects from the first end of the auxiliary inductor L2, which is connected to the auxiliary switch Ss, to the high-side input terminal Tpin via the auxiliary diode Ds and the first flyback diode Da1, and connects from the second end of the resonance inductor L2 to the low-side input terminal Tnin via the diode Du, which is similar to the configuration of the second electrical path P2A.

The power converter 10L carries out the ZVS control of the main switches Sa1 and Sa2, which is similar to the power converter 10 of the first embodiment, and also carries out the ZVS control of the main switches Sb1 and Sb2, which is similar to the power converter 10J of the eighth embodiment.

The second electrical path P70 is configured to connect among the high-side input terminal Tpin, the resonance inductor L2, and the low-side input terminal Tnin. This enables the electromagnetic energy charged in the resonance inductor L2 to be supplied to the DC power source 40 and the smoothing capacitor 33, thus improving power efficiency of the power converter 10L.

Accordingly, the power converter 10L achieves advantageous effects that are substantially identical to those achieved by the power converter 10 and those achieved by the power converter 10J.

Eleventh Embodiment

Figure 23:
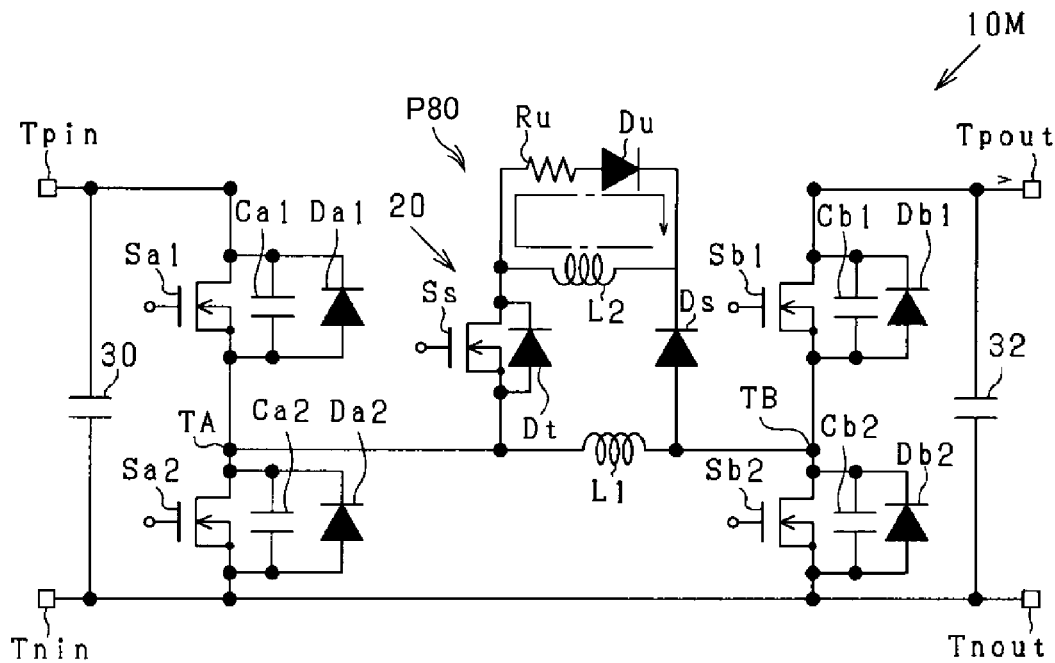
FIG. 23 is a circuit diagram schematically illustrating the principal components of a power converter according to the eleventh embodiment of the present disclosure.

The following describes a power converter 10M according to the eleventh embodiment of the present disclosure with reference to FIG. 23.

The structure and functions of the power converter 10M according to the eleventh embodiment are slightly different from those of the power converter 10L according to the tenth embodiment by the following points. So, the different points will be mainly described hereinafter.

Referring to FIG. 23, the power converter 10M includes a second electrical path P80 as illustrated by the dot-and-dash line in FIG. 23.

Specifically, the second electrical path P80 connects both first and second ends of the resonance reactor L2, and enables a part of the second current IL2 to flow therethrough while bypassing the auxiliary switch Ss.

The second electrical path P80 includes a resistor Ru and the diode Du provided thereon and connected in series to each other. Specifically, the resistor Ru has opposing first and second ends. The first end of the resistor Ru is connected to the first end of the resonance inductor L2, and the second end of the resistor Ru is connected to the anode of the diode Du. The cathode of the diode Du is connected to the second end of the resonance inductor L2.

Even if a surge voltage occurred across the resonance inductor L2 in the direction corresponding to the forward direction of the diode Du in response to turn-off of the auxiliary switch Ss while the current IL2 flows through the auxiliary circuit 20, the diode Du would be activated to enable the electromagnetic energy stored in the resonance inductor L2 to be discharged as the second current IL2 via the second electrical path P80. This would protect the resonance inductor L2 and its peripheral elements from a surge voltage generated across the resonance inductor L2.

Note that the second electrical path P80 including the resistor Ru and the diode Du provided thereon and connected in series to each other can be applied to the aforementioned step-down converters and the aforementioned step-up converters.

Twelfth Embodiment

Figure 24:
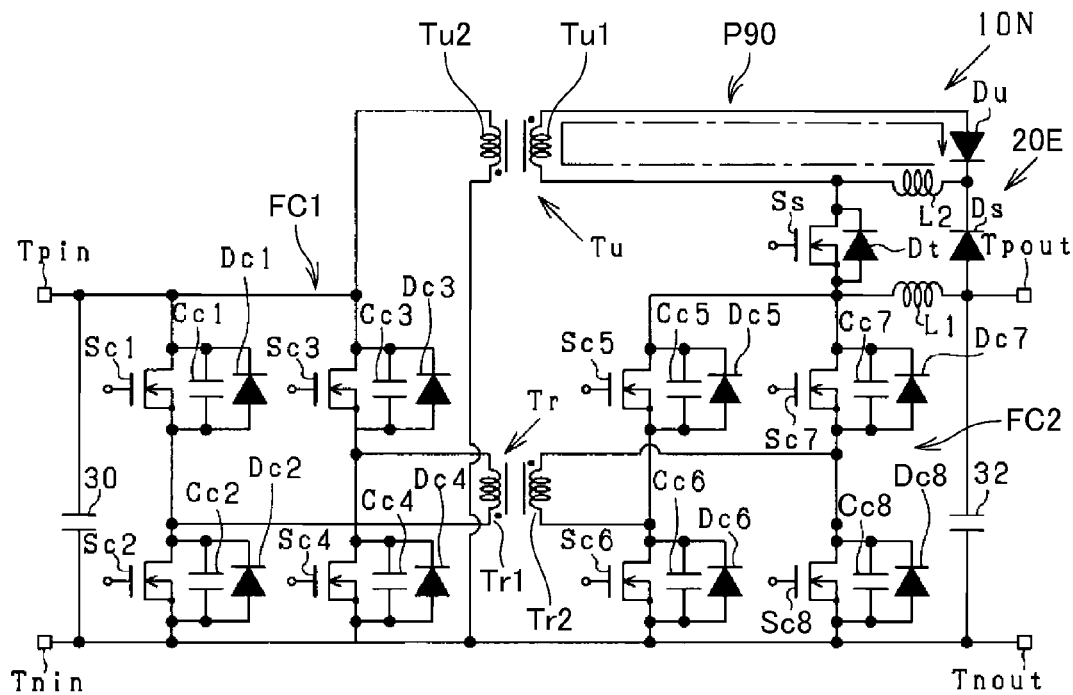
FIG. 24 is a circuit diagram schematically illustrating the principal components of a power converter according to the twelfth embodiment of the present disclosure.

The following describes a power converter 10N according to the twelfth embodiment of the present disclosure with reference to FIG. 24.

The structure and functions of the power converter 10N according to the twelfth embodiment are slightly different from those of the power converter 10 according to the first embodiment by the following points. So, the different points will be mainly described hereinafter.

Referring to FIG. 24, the power converter 10N is designed as an isolated DC-DC converter.

Specifically, the power converter 10N includes a transformer Tr, a first full-bridge circuit FC1, and a second full-bridge circuit FC2.

The transformer Tr includes a first primary winding Tr1 and a second primary winding Tr1 magnetically coupled to each other.

The first full-bridge circuit FC1 is comprised of a first pair of upper- and lower-arm switches Sc1 and Sc2 connected in series to each other, and a second pair of upper- and lower-arm switches Sc3 and Sc4 connected in series to each other.

The first full-bridge circuit FC1 is also comprised of (1) Main capacitors Cc1 to Cc4 connected in parallel to the respective switches Sc1 to Sc4

(2) Flyback diodes Dc1 to Dc4 connected in antiparallel to the respective main switches Sc1 to Sc4

The switches Sc1 to SC4 are parallelly connected to each other in full-bridge configuration, and the drains of the upper-arm switches Sc1 and Sc3 are commonly connected to the high-side input terminal Tpin. The sources of the lower-arm switches Sc2 and Sc4 are commonly connected to the low-side input terminal Tnin.

The connection point between the upper- and lower-arm switches Sc1 and Sc2 is connected to a first end of the primary winding Tr1, and the connection point between the upper- and lower-arm switches Sc3 and Sc4 is connected to a second end of the primary winding Tr1 opposite to the first end.

The second full-bridge circuit FC2 is comprised of a first pair of upper- and lower-arm switches Sc5 and Sc6 connected in series to each other, and a second pair of upper- and lower-arm switches Sc7 and Sc8 connected in series to each other.

The second full-bridge circuit FC2 is also comprised of (1) Main capacitors Cc5 to Cc8 connected in parallel to the respective switches Sc5 to Sc8

(2) Flyback diodes Dc5 to Dc8 connected in antiparallel to the respective main switches Sc5 to Sc8

The switches Sc5 to Sc8 are parallelly connected to each other in full-bridge configuration, and the drains of the upper-arm switches Sc5 and Sc7 are commonly connected to the first end of the main inductor L1. The second end of the main inductor L1 is connected to the high-side output terminal Tpout. The sources of the lower-arm switches Sc6 and Sc8 are commonly connected to the low-side output terminal Tnout.

The connection point between the upper- and lower-arm switches Sc5 and Sc6 is connected to a first end of the secondary winding Tr2, and the connection point between the upper- and lower-arm switches Sc7 and Sc8 is connected to a second end of the secondary winding Tr2 opposite to the first end.

The power converter 10N also includes an auxiliary circuit 20E, which includes the auxiliary diode Ds, the auxiliary switch Ss, and the resonance inductor L2 connected in series.

The resonance inductor L2 has opposing first and second ends. The first end of the resonance inductor L2 is connected to the drain of the auxiliary switch Ss, and the source of the auxiliary switch Ss is connected to the first end of the main inductor L1. The second end of the resonance inductor L2 is connected to the cathode of the auxiliary diode Ds. The anode of the auxiliary diode Ds is connected to the low-side output terminal Tnout.

The second mode of the power converter 10N with the switches Sc5 to Sc8 being off and the auxiliary switch Ss being on enables (1) The resonance inductor L2 and the main capacitors Cc5 and Cc6 to constitute a resonant circuit RC10 through the auxiliary switch Ss being on (2) The resonance inductor L2 and the main capacitors Cc7 and Cc8 to constitute a resonant circuit RC11 through the auxiliary switch Ss being on Each of the resonant circuit RC10 and RC11 is connected to the high-side output terminal Tpout by the first electrical path P1 including the auxiliary diode Ds.

The resonant circuit RC results in the resonance inductor L2 resonating with each of the main capacitors Cc5 and Cc7. This resonance causes the electrical charge, which has been stored in each of the main capacitors Cc5 and Cc7, to be discharged, so that the voltage across each of the first and second main capacitor Ca5 and Ca1 decreases. This results in the drain-source voltage of each of the main switches Sc5 and Sc7 decreasing down to zero. Turning on the main switch Sc5 or Sc7 with its drain-source voltage being zero enables the ZVS control of the main switch Sc5 or Sc7 to be carried out, thus reducing turn-on loss of the main switch Sc5 or Sc7.

The power converter 10N includes a second electrical path, i.e. a bypass electrical path, P90 as illustrated by the dot-and-dash line in FIG. 24. The second electrical path P90 connects both first and second ends of the resonance reactor L2, and enables a part of the second current IL2 to flow therethrough while bypassing the auxiliary switch Ss.

The second electrical path P90 includes a primary coil Tu1 of a transformer Tu, and the diode Du provided thereon and connected in series to each other. Specifically, the primary coil Tu1 has opposing first and second ends. The first end of the primary coil Tu1 is connected to the anode of the diode Du, and the cathode of the diode Du is connected to the second end of the resonance inductor L2 and to the cathode of the auxiliary diode Ds. The second end of the primary coil Tu1 is connected to the first end of the resonance inductor L2.

The transformer Tu also includes a secondary winding Tu2 magnetically couple to the primary coil Tu1. The secondary coil Tu2 has opposing first and second ends. The first end of the secondary coil Tu2 is connected to the high-side input terminal Tpin, and the second end of the secondary coil Tu2 is connected to the low-side input terminal Tnin.

The transformer Tu has a predetermined ratio of the number of turns of the primary winding Tu1 to the number of turns of the secondary winding Tu2.

Even if a surge voltage occurred across the resonance inductor L2 in the direction corresponding to the forward direction of the diode Du in response to turn-off of the auxiliary switch Ss while the current IL2 flows through the auxiliary circuit 20E, the diode Du would be activated. This would enable the electromagnetic energy stored in the resonance inductor L2 to be discharged as the second current IL2 via the second electrical path P90. The second current IL2 flows through the primary coil Tu1, so that a predetermined voltage is induced across the secondary coil Tu2. The voltage induced across the secondary coil Tu2 is restored in the DC power source 40 and the smoothing capacitor 30 via the high-side input terminals Tpin and Tnin. This would protect the resonance inductor L2 and its peripheral elements from a surge voltage generated across the resonance inductor L2.

Adjusting the ratio of the number of turns of the primary winding Tu1 to the number of turns of the secondary winding Tu2 enables the voltage VL2 across the resonance inductor L2 with the diode Du being activated. That is, erroneous turn-off of the auxiliary switch Ss would cause a surge voltage generated across the resonance inductor L2. If the surge voltage, i.e. the voltage VL2, across the resonance inductor L2 is higher than the input voltage Vin across the secondary coil Tu2 and the forward voltage across the diode Du, the diode Du is energized. That is, a value of the voltage VL2 across the resonance inductor L2, which enables the diode Du to be energized, changes depending on the ratio of the number of turns of the primary winding Tu1 to the number of turns of the secondary winding Tu2. In other words, adjusting the ratio of the number of turns of the primary winding Tu1 to the number of turns of the secondary winding Tu2 enables the voltage VL2 applied across the resonance inductor L2 to be freely determined. This enables a maximum value of the voltage VL2 across the resonance inductor L2 to be feely determined.

As described above, the power converter 10N achieves advantageous effects that are substantially identical to those achieved by the power converter 10.

Thirteenth Embodiment

Figure 25:
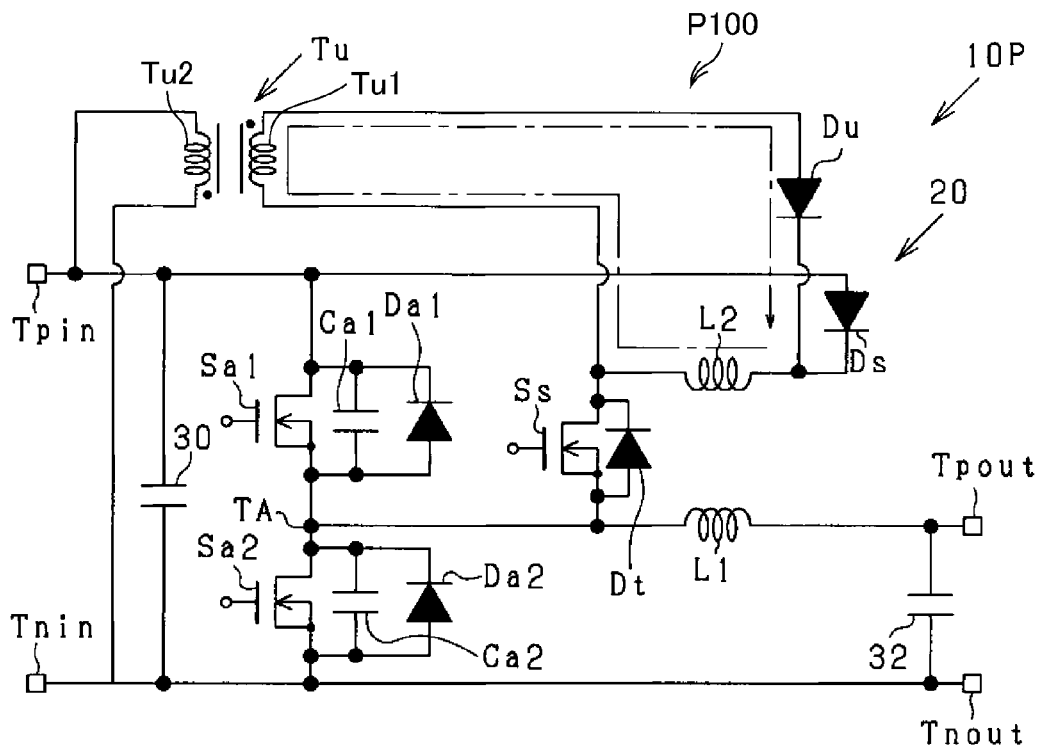
FIG. 25 is a circuit diagram schematically illustrating the principal components of a power converter according to the thirteenth embodiment of the present disclosure.

The following describes a power converter 10P according to the thirteenth embodiment of the present disclosure with reference to FIG. 25.

The structure and functions of the power converter 10P according to the thirteenth embodiment are slightly different from those of the power converter 10 according to the first embodiment by the following points. So, the different points will be mainly described hereinafter.

Referring to FIG. 25, the power converter 10P includes an auxiliary circuit 20F whose structure differs from the structure of the auxiliary circuit 20 of the power converter 10.

Specifically, as illustrated in FIG. 25, the power converter 10P includes an auxiliary circuit 20F including the auxiliary diode Ds, the auxiliary switch Ss, and the resonance inductor L2 connected in series. A diode Dt is connected across the auxiliary switch Ss in antiparallel to the auxiliary switch Ss. An intrinsic diode of the auxiliary switch Ss can serve as the diode Dt. An external diode can be provided to be connected across the auxiliary switch Ss as the diode Dt.

The resonance inductor L2 has opposing first and second ends. The first end of the resonance inductor L2 is connected to the drain of the auxiliary switch Ss, and the second end of the resonance inductor L2 is connected to the cathode of the auxiliary diode Ds. The cathode of the auxiliary diode Ds is connected to the high-side input terminal Tpin. The source of the auxiliary switch Ss is connected to both the connection point TA and the first end of the main inductor L1. That is, the power converter 10P includes a first electrical path P1B that connects from the high-side input terminal Tpin to the low-side input terminal Tnin via the auxiliary diode Ds, the resonance inductor L2, the auxiliary switch Ss, the connection point TA, and the second main switch Sa2.

That is, the auxiliary diode Ds and the auxiliary switch Ss are provided on the first electrical path P1B.

The power converter 10P includes a second electrical path, i.e. a bypass electrical path, P100 as illustrated by the dot-and-dash line in FIG. 25. The second electrical path P100 connects both first and second ends of the resonance reactor L2, and enables a part of the second current IL2 to flow therethrough while bypassing the auxiliary switch Ss.

Like the twelfth embodiment, the second electrical path P100 includes the primary coil Tu1 of the transformer Tu, and the diode Du provided thereon and connected in series to each other. Specifically, the primary coil Tu1 has opposing first and second ends. The first end of the primary coil Tu1 is connected to the anode of the diode Du, and the cathode of the diode Du is connected to the second end of the resonance inductor L2 and to the cathode of the auxiliary diode Ds. The second end of the primary coil Tu1 is connected to the first end of the resonance inductor L2.

The transformer Tu includes the secondary winding Tu2 magnetically couple to the primary coil Tu1. The secondary coil Tu2 has opposing first and second ends. The first end of the secondary coil Tu2 is connected to the high-side input terminal Tpin, and the second end of the secondary coil Tu2 is connected to the low-side input terminal Tnin.

Even if a surge voltage occurred across the resonance inductor L2 in the direction corresponding to the forward direction of the diode Du in response to turn-off of the auxiliary switch Ss while the current IL2 flows through the auxiliary circuit 20F, the diode Du would be activated. This would enable the electromagnetic energy stored in the resonance inductor L2 to be discharged as the second current IL2 via the second electrical path P100. The second current IL2 flows through the primary coil Tu1, so that a predetermined voltage is induced across the secondary coil Tu2. The voltage induced across the secondary coil Tu2 is restored in the DC power source 40 and the smoothing capacitor 30 via the high-side input terminals Tpin and Tnin. This would protect the resonance inductor L2 and its peripheral elements from a surge voltage generated across the resonance inductor L2.

Fourteenth Embodiment

Figure 26:
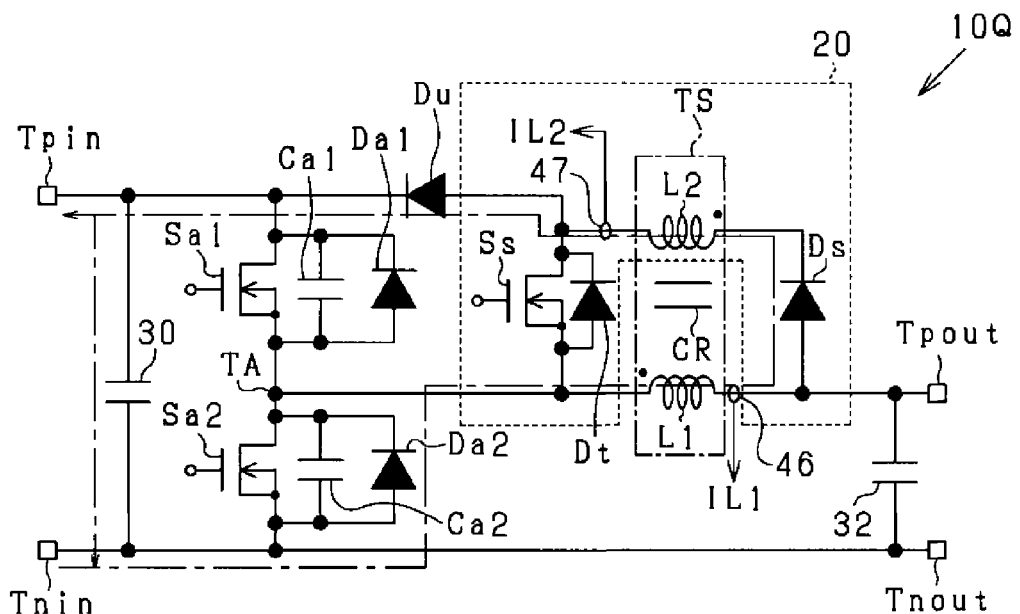
FIG. 26 is a circuit diagram schematically illustrating the principal components of a power converter according to the fourteenth embodiment of the present disclosure.

The following describes a power converter 10Q according to the fourteenth embodiment of the present disclosure with reference to FIG. 26.

The structure and functions of the power converter 10Q according to the fourteenth embodiment are slightly different from those of the power converter 10 according to the first embodiment by the following points. So, the different points will be mainly described hereinafter.

Referring to FIG. 26, the power converter 10Q includes a transformer TS including a primary winding serving as the main inductor L1, and a secondary winding serving as the resonance inductor L2. That is, the main inductor L1 is magnetically coupled to the resonance inductor L2.

The polarity of the first end of the main inductor L1 is identical to the polarity of the second end of the resonance inductor L2.

The transformer TS has a predetermined ratio of the number of turns of the main inductor L1 to the number of turns of the resonance inductor L2.

This enables the voltage VL2 across the resonance inductor L2 to be higher than the product of the voltage VL1 across the main inductor L1 and the ratio of the main inductor L1 to the number of turns of the resonance inductor L2. This results in shorter time required for the resonance inductor L2 to be charged.

Each of the power converters according to the above embodiments can include at least an inductor and a capacitance component additionally connected to the resonance inductor L2, and serve at least the inductor and the capacitor as a resonant circuit.

Each of the power converters according to the above embodiments can use insulated gate bipolar transistors (IGBTs) or bipolar transistors as the switches.

Each of the power converters according to the above embodiments is designed as a DC-DC converter for converting input DC power into output DC power whose level is different from the level of the input DC power. Each of the power converters according to the above embodiments can be designed as a power converter for converting input AC power into output DC power or output AC power, or as a power converter for converting input DC power into output DC power or output AC power. For example, each of the power converters according to the above embodiments can be designed as a power converter, which includes a rectifier, such as a full-wave rectifier, for converting an AC voltage supplied from an external AC power source into a DC voltage.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. A power converter having a high-side input terminal and a low-side input terminal connected to a power source, and a high-side output terminal and a low-side output terminal connected to an electrical load, the power converter comprising:
a first main switch;
a second main switch connected in series to the first main switch, a capacitance component being connected in parallel to at least one of the first and second main switches;
a main inductor having first and second ends, the first end being connected to a connection point of the first and second main switches;
a controller configured to complementarily turn on the first and second main switches to:
charge electromagnetic energy input from the power source via the high-side input terminal and the low-side input terminal into the main inductor; and;
output the electromagnetic energy charged in the main inductor to the electrical load via the high-side output terminal and the low-side output terminal;
a resonance inductor connected in series to the capacitance component, the resonance inductor and the capacitance component constituting a series resonant circuit;
a first electrical path connecting between the series resonant circuit and a selected terminal from the high-side input terminal, the low-side input terminal, the high-side output terminal and the low-side output terminal;
an auxiliary diode having a forward direction, the auxiliary diode being provided on one of the series resonant circuit and the first electrical path such that a current flow direction therethrough is along a direction from the selected terminal toward the resonance inductor;
an auxiliary switch provided on one of the series resonant circuit and the first electrical path, the auxiliary switch being configured to, when turned on, cause:
an inductor current to flow through the auxiliary diode to the resonance inductor, thus storing electromagnetic energy in the resonance inductor; and
the resonance inductor and the capacitance component of the series resonant circuit to resonate with each other;
a second electrical path that bypasses the auxiliary switch for flow of the inductor current; and
a discharge unit provided on the second electrical path, the discharge unit being activated to discharge the electromagnetic energy stored in the resonance inductor via the second electrical path.

2. The power converter according to claim 1, wherein:
the discharge unit is activated when a voltage across the resonance inductor is equal to or higher than a predetermined threshold voltage.

3. The power converter according to claim 1, wherein:
the second electrical path connects from the high-side input terminal to the low-side input terminal via the resonance inductor.

4. The power converter according to claim 3, wherein:
the resonance inductor has a terminal connected to the auxiliary switch, so that the auxiliary switch is provided between the resonance inductor and the connection point; and
the discharge unit is provided between the high-side input terminal and the terminal of the resonance inductor to which the auxiliary switch is connected.

5. The power converter according to claim 3, wherein:
the resonance inductor has a terminal connected to the auxiliary switch, so that the auxiliary switch is provided between the resonance inductor and the high-side output terminal; and
the discharge unit is provided between the low-side input terminal and the terminal of the resonance inductor to which the auxiliary switch is connected.

6. The power converter according to claim 1, wherein:
the second electrical path connects from the high-side output terminal to the low-side output terminal via the resonance inductor.

7. The power converter according to claim 6, wherein:
the resonance inductor has a terminal connected to the auxiliary switch, so that the auxiliary switch is provided between the resonance inductor and the high-side input terminal; and
the discharge unit is provided between the high-side output terminal and the terminal of the resonance inductor to which the auxiliary switch is connected.

8. The power converter according to claim 6, wherein:
the resonance inductor has a terminal connected to the auxiliary switch, so that the auxiliary switch is provided between the resonance inductor and the connection point; and
the discharge unit is provided between the low-side input terminal and the terminal of the resonance inductor to which the auxiliary switch is connected.

9. The power converter according to claim 1, wherein the discharge unit comprises a diode.

10. The power converter according to claim 3, wherein:
the second path is configured such that, when the auxiliary switch is off, the inductor current flows therethrough without flowing through the auxiliary switch.

11. The power converter according to claim 1, wherein:
the resonance inductor has opposing ends; and
the second path connects the opposing ends of the resonance inductor.

12. The power converter according to claim 11, wherein:
the discharge unit comprises two Zener diodes connected in their opposite directions.

13. The power converter according to claim 11, wherein:
the discharge unit comprises a diode.

14. The power converter according to claim 11, wherein:
the controller is configured to activate the discharge unit when a voltage across the auxiliary switch is equal to or higher than a predetermined threshold voltage.

15. The power converter according to claim 11, wherein:
the second electrical path comprises a resistor provided thereon, the resistor being connected in series to the discharge unit.

16. The power converter according to claim 11, wherein:
the second electrical path comprises a primary winding of a transformer, the primary winding being provided on the second electrical path; and
a secondary coil of the transformer being provided between the high-side input terminal and the low-side input terminal.

* * * * *